United States Patent
Kondo et al.

(10) Patent No.: US 9,025,697 B2
(45) Date of Patent: May 5, 2015

(54) TRANSMITTER, TRANSMISSION METHOD USED BY THE SAME, RECEIVER FOR RECEIVING A RADIO SIGNAL FROM TRANSMITTER AND WIRELESS COMMUNICATION SYSTEM INCLUDING THE SAME

(71) Applicants: Advanced Telecommunications Research Institute International, Soraku-gun, Kyoto (JP); NEC Communication Systems, Ltd., Minato-ku, Tokyo (JP)

(72) Inventors: Yoshihisa Kondo, Soraku-gun (JP); Hiroyuki Yomo, Soraku-gun (JP); Suhua Tang, Soraku-gun (JP); Takatoshi Kimura, Soraku-gun (JP); Masahito Iwai, Minato-ku (JP); Yukihiro Hara, Minato-ku (JP); Tetsuya Ito, Minato-ku (JP)

(73) Assignees: Advanced Telecommunications Research Institute International, Kyoto (JP); NEC Communication Systems, Ltd., Tokyo (JP)

(*) Notice: Subject to any disclaimer, the term of this patent is extended or adjusted under 35 U.S.C. 154(b) by 0 days.

(21) Appl. No.: 14/380,378

(22) PCT Filed: Feb. 25, 2013

(86) PCT No.: PCT/JP2013/054647
§ 371 (c)(1),
(2) Date: Aug. 22, 2014

(87) PCT Pub. No.: WO2013/129277
PCT Pub. Date: Sep. 6, 2013

(65) Prior Publication Data
US 2015/0023447 A1   Jan. 22, 2015

(30) Foreign Application Priority Data

Feb. 28, 2012   (JP) ................. 2012-041532

(51) Int. Cl.
*H04L 1/00* (2006.01)
*H04L 25/49* (2006.01)

(52) U.S. Cl.
CPC .............. *H04L 1/0083* (2013.01); *H04L 25/49* (2013.01)

(58) Field of Classification Search
CPC .................... H03M 13/1105; H03M 13/6318; H04L 1/0047; H04L 1/0675; H04L 1/0083
See application file for complete search history.

(56) References Cited

U.S. PATENT DOCUMENTS

| 6,765,959 B1 | 7/2004 | Tanaka et al. |
| 2009/0110131 A1 | 4/2009 | Bornhoft et al. |
| 2011/0261904 A1* | 10/2011 | Seier et al. .................... 375/298 |

FOREIGN PATENT DOCUMENTS

| JP | 05-122778 A | 5/1993 |
| JP | 11-355365 A | 12/1999 |
| JP | 2007-158651 A | 6/2007 |

OTHER PUBLICATIONS

Official Communication issued in International Patent Application No. PCT/JP2013/054647, mailed on Apr. 9, 2013.

(Continued)

*Primary Examiner* — Curtis Odom
(74) *Attorney, Agent, or Firm* — Keating & Bennett, LLP

(57) ABSTRACT

A transmitter incorporates a table (TBL1) for assigning the frame lengths of 560 μs and 600 μs to the code "0" in a binary system and assigning the frame lengths of 600 μs and 560 μs to the code "1" in the binary system. The transmitter refers to the table (TBL1) and assigns the two frame lengths of 560 μs and 600 μs and the two frame lengths of 600 μs and 560 μs to the codes "0" and "1", respectively, in the code sequences [0,0], [0,1], [1,0] and [1,1] representing the transmission information "0" to "3" represented using the binary system, and sequentially transmits four radio signals having the assigned four frame lengths.

12 Claims, 19 Drawing Sheets

(56) References Cited

OTHER PUBLICATIONS

Kondo et al., "Wake-up Radio using IEEE 802.11 Frame Length Modulation for Radio-On-Demand Wireless LAN", 22nd IEEE Personal Indoor Mobile Radio Communications, Sep. 2011, pp. 874-878.

Peterson et al., "Error-Correction Capabilities of Linear Codes", The MIT Press, Mar. 15, 1972, pp. 76-116.

Ungerboeck, "Channel Coding with Multilevel/Phase Signals", IEEE Transactions on Information Theory, vol. IT-28, No. 1, Jan. 1982, pp. 55-67.

Armstrong, "Some Recent Developments of Regenerative Circuits", Proceedings of the Institute of Radio Engineers, vol. 10, Issue 4, Aug. 1922, pp. 244-260.

\* cited by examiner

FIG. 4

|  | FIRST CODE | SECOND CODE | TRANSMISSION INFORMATION |
|---|---|---|---|
| TRANSMISSION INFORMATION 0 | CODE 0 | CODE 0 | 0 |
| TRANSMISSION INFORMATION 1 | CODE 0 | CODE 1 | 1 |
| TRANSMISSION INFORMATION 2 | CODE 1 | CODE 0 | 2 |
| TRANSMISSION INFORMATION 3 | CODE 1 | CODE 1 | 3 |

(a)

TBL1

|  | FIRST FRAME | SECOND FRAME |
|---|---|---|
| CODE 0 | 560 μs | 600 μs |
| CODE 1 | 600 μs | 560 μs |

|  | FIRST CODE | TRANSMISSION INFORMATION |
|---|---|---|
| TRANSMISSION INFORMATION 0 | CODE 0 | 0 |
| TRANSMISSION INFORMATION 1 | CODE 1 | 1 |
| TRANSMISSION INFORMATION 2 | CODE 2 | 2 |
| TRANSMISSION INFORMATION 3 | CODE 3 | 3 |

(a)

TBL2-1

|  | FIRST FRAME | SECOND FRAME |
|---|---|---|
| CODE 0 | 480 $\mu$s | 600 $\mu$s |
| CODE 1 | 520 $\mu$s | 560 $\mu$s |
| CODE 2 | 560 $\mu$s | 520 $\mu$s |
| CODE 3 | 600 $\mu$s | 480 $\mu$s |

(b)

TBL2-2

|  | FIRST FRAME | SECOND FRAME | THIRD FRAME |
|---|---|---|---|
| CODE 0 | 480 $\mu$s | 600 $\mu$s | 540 $\mu$s |
| CODE 1 | 520 $\mu$s | 560 $\mu$s | 540 $\mu$s |
| CODE 2 | 560 $\mu$s | 520 $\mu$s | 540 $\mu$s |
| CODE 3 | 600 $\mu$s | 480 $\mu$s | 540 $\mu$s |

(c)

TBL2-3

|  | FIRST FRAME | SECOND FRAME | THIRD FRAME |
|---|---|---|---|
| CODE 0 | 480 $\mu$s | 540 $\mu$s | 600 $\mu$s |
| CODE 1 | 520 $\mu$s | 540 $\mu$s | 560 $\mu$s |
| CODE 2 | 560 $\mu$s | 540 $\mu$s | 520 $\mu$s |
| CODE 3 | 600 $\mu$s | 540 $\mu$s | 480 $\mu$s |

(d)

TBL2-4

|  | FIRST FRAME | SECOND FRAME | THIRD FRAME |
|---|---|---|---|
| CODE 0 | 540 $\mu$s | 480 $\mu$s | 600 $\mu$s |
| CODE 1 | 540 $\mu$s | 520 $\mu$s | 560 $\mu$s |
| CODE 2 | 540 $\mu$s | 560 $\mu$s | 520 $\mu$s |
| CODE 3 | 540 $\mu$s | 600 $\mu$s | 480 $\mu$s |

|  | FIRST CODE | TRANSMISSION INFORMATION |
|---|---|---|
| TRANSMISSION INFORMATION 0 | CODE 0 | 0 |
| TRANSMISSION INFORMATION 1 | CODE 1 | 1 |
| TRANSMISSION INFORMATION 2 | CODE 2 | 2 |
| TRANSMISSION INFORMATION 3 | CODE 3 | 3 |

(b)

|  | FIRST CODE | TRANSMISSION INFORMATION |
|---|---|---|
| TRANSMISSION INFORMATION 0 | CODE 4 | 0 |
| TRANSMISSION INFORMATION 1 | CODE 5 | 1 |
| TRANSMISSION INFORMATION 2 | CODE 6 | 2 |
| TRANSMISSION INFORMATION 3 | CODE 7 | 3 |

(c)

|  | FIRST CODE | TRANSMISSION INFORMATION |
|---|---|---|
| TRANSMISSION INFORMATION 0 | CODE 0 | 0 |
| TRANSMISSION INFORMATION 1 | CODE 2 | 1 |
| TRANSMISSION INFORMATION 2 | CODE 4 | 2 |
| TRANSMISSION INFORMATION 3 | CODE 6 | 3 |

(d)

|  | FIRST CODE | TRANSMISSION INFORMATION |
|---|---|---|
| TRANSMISSION INFORMATION 0 | CODE 0 | 0 |
| TRANSMISSION INFORMATION 1 | CODE 1 | 1 |
| TRANSMISSION INFORMATION 2 | CODE 6 | 2 |
| TRANSMISSION INFORMATION 3 | CODE 7 | 3 |

TBL3

|  | FIRST FRAME | SECOND FRAME |
|---|---|---|
| CODE 0 | 1600 | 480 |
| CODE 1 | 1440 | 640 |
| CODE 2 | 1280 | 800 |
| CODE 3 | 1120 | 960 |
| CODE 4 | 960 | 1120 |
| CODE 5 | 800 | 1280 |
| CODE 6 | 640 | 1440 |
| CODE 7 | 480 | 1600 |

| | FIRST CODE | SECOND CODE | TRANSMISSION INFORMATION |
|---|---|---|---|
| TRANSMISSION INFORMATION 0 | CODE 0 | CODE 0 | 0 |
| TRANSMISSION INFORMATION 1 | CODE 0 | CODE 1 | 1 |
| TRANSMISSION INFORMATION 2 | CODE 0 | CODE 2 | 2 |
| TRANSMISSION INFORMATION 3 | CODE 0 | CODE 3 | 3 |
| ⋮ | ⋮ | ⋮ | ⋮ |
| TRANSMISSION INFORMATION 252 | CODE 15 | CODE 12 | 252 |
| TRANSMISSION INFORMATION 253 | CODE 15 | CODE 13 | 253 |
| TRANSMISSION INFORMATION 254 | CODE 15 | CODE 14 | 254 |
| TRANSMISSION INFORMATION 255 | CODE 15 | CODE 15 | 255 |

(a)

TBL4

| | FIRST FRAME | SECOND FRAME |
|---|---|---|
| CODE 0 | 480 | 2880 |
| CODE 1 | 640 | 2720 |
| CODE 2 | 800 | 2560 |
| CODE 3 | 960 | 2400 |
| CODE 4 | 1120 | 2240 |
| CODE 5 | 1280 | 2080 |
| CODE 6 | 1440 | 1920 |
| CODE 7 | 1600 | 1760 |
| CODE 8 | 1760 | 1600 |
| CODE 9 | 1920 | 1440 |
| CODE 10 | 2080 | 1280 |
| CODE 11 | 2240 | 1120 |
| CODE 12 | 2400 | 960 |
| CODE 13 | 2560 | 800 |
| CODE 14 | 2720 | 640 |
| CODE 15 | 2880 | 480 |

| | FIRST CODE | SECOND CODE | THIRD CODE | FOURTH CODE | TRANSMISSION INFORMATION |
|---|---|---|---|---|---|
| TRANSMISSION INFORMATION 0 | CODE 0 | CODE 0 | CODE 0 | CODE 0 | 0 |
| TRANSMISSION INFORMATION 1 | CODE 0 | CODE 0 | CODE 0 | CODE 1 | 1 |
| TRANSMISSION INFORMATION 2 | CODE 0 | CODE 0 | CODE 0 | CODE 2 | 2 |
| TRANSMISSION INFORMATION 3 | CODE 0 | CODE 0 | CODE 0 | CODE 3 | 3 |
| TRANSMISSION INFORMATION 4 | CODE 0 | CODE 0 | CODE 1 | CODE 0 | 4 |
| TRANSMISSION INFORMATION 5 | CODE 0 | CODE 0 | CODE 1 | CODE 1 | 5 |
| TRANSMISSION INFORMATION 6 | CODE 0 | CODE 0 | CODE 1 | CODE 2 | 6 |
| TRANSMISSION INFORMATION 7 | CODE 0 | CODE 0 | CODE 1 | CODE 3 | 7 |
| ⋮ | ⋮ | ⋮ | ⋮ | ⋮ | ⋮ |
| TRANSMISSION INFORMATION 252 | CODE 3 | CODE 3 | CODE 3 | CODE 0 | 252 |
| TRANSMISSION INFORMATION 253 | CODE 3 | CODE 3 | CODE 3 | CODE 1 | 253 |
| TRANSMISSION INFORMATION 254 | CODE 3 | CODE 3 | CODE 3 | CODE 2 | 254 |
| TRANSMISSION INFORMATION 255 | CODE 3 | CODE 3 | CODE 3 | CODE 3 | 255 |

(a)

TBL5

| | FIRST FRAME | SECOND FRAME |
|---|---|---|
| CODE 0 | 480 | 600 |
| CODE 1 | 520 | 560 |
| CODE 2 | 560 | 520 |
| CODE 3 | 600 | 480 |

| | FIRST CODE | SECOND CODE | THIRD CODE | FOURTH CODE | FIFTH CODE | SIXTH CODE | SEVENTH CODE | EIGHTH CODE | TRANSMISSION INFORMATION |
|---|---|---|---|---|---|---|---|---|---|
| TRANSMISSION INFORMATION 0 | CODE 0 | CODE 0 | CODE 0 | CODE 0 | CODE 0 | CODE 0 | CODE 0 | CODE 0 | 0 |
| TRANSMISSION INFORMATION 1 | CODE 0 | CODE 0 | CODE 0 | CODE 0 | CODE 0 | CODE 0 | CODE 0 | CODE 1 | 1 |
| TRANSMISSION INFORMATION 2 | CODE 0 | CODE 0 | CODE 0 | CODE 0 | CODE 0 | CODE 0 | CODE 1 | CODE 0 | 2 |
| TRANSMISSION INFORMATION 3 | CODE 0 | CODE 0 | CODE 0 | CODE 0 | CODE 0 | CODE 0 | CODE 1 | CODE 1 | 3 |
| TRANSMISSION INFORMATION 4 | CODE 0 | CODE 0 | CODE 0 | CODE 0 | CODE 0 | CODE 1 | CODE 0 | CODE 0 | 4 |
| TRANSMISSION INFORMATION 5 | CODE 0 | CODE 0 | CODE 0 | CODE 0 | CODE 0 | CODE 1 | CODE 0 | CODE 1 | 5 |
| TRANSMISSION INFORMATION 6 | CODE 0 | CODE 0 | CODE 0 | CODE 0 | CODE 0 | CODE 1 | CODE 1 | CODE 0 | 6 |
| TRANSMISSION INFORMATION 7 | CODE 0 | CODE 0 | CODE 0 | CODE 0 | CODE 0 | CODE 1 | CODE 1 | CODE 1 | 7 |
| ... | ... | ... | ... | ... | ... | ... | ... | ... | ... |
| TRANSMISSION INFORMATION 252 | CODE 1 | CODE 1 | CODE 1 | CODE 1 | CODE 1 | CODE 1 | CODE 0 | CODE 0 | 252 |
| TRANSMISSION INFORMATION 253 | CODE 1 | CODE 1 | CODE 1 | CODE 1 | CODE 1 | CODE 1 | CODE 0 | CODE 1 | 253 |
| TRANSMISSION INFORMATION 254 | CODE 1 | CODE 1 | CODE 1 | CODE 1 | CODE 1 | CODE 1 | CODE 1 | CODE 0 | 254 |
| TRANSMISSION INFORMATION 255 | CODE 1 | CODE 1 | CODE 1 | CODE 1 | CODE 1 | CODE 1 | CODE 1 | CODE 1 | 255 |

(a)

TBL6

| | FIRST FRAME | SECOND FRAME |
|---|---|---|
| CODE 0 | 560 | 600 |
| CODE 1 | 600 | 560 |

|  | FIRST CODE | SECOND CODE | THIRD CODE | ... | xth CODE | TRANSMISSION INFORMATION |
|---|---|---|---|---|---|---|
| TRANSMISSION INFORMATION 0 | $a_{0,0}$ | $a_{0,1}$ | $a_{0,2}$ | ... | $a_{0,x-1}$ | 1 |
| TRANSMISSION INFORMATION 1 | $a_{1,0}$ | $a_{1,1}$ | $a_{1,2}$ | ... | $a_{1,x-1}$ | 2 |
| TRANSMISSION INFORMATION 2 | $a_{2,0}$ | $a_{2,1}$ | $a_{2,2}$ | ... | $a_{2,x-1}$ | 3 |
| ⋮ | ⋮ | ⋮ | ⋮ | ⋮ | ⋮ | ⋮ |
| TRANSMISSION INFORMATION n−2 | $a_{n-2,0}$ | $a_{n-2,1}$ | $a_{n-2,2}$ | ... | $a_{n-2,x-1}$ | n−2 |
| TRANSMISSION INFORMATION n−1 | $a_{n-1,0}$ | $a_{n-1,1}$ | $a_{n-1,2}$ | ... | $a_{n-1,x-1}$ | n−1 |

(a)

TBL

|  | FIRST FRAME | SECOND FRAME |
|---|---|---|
| CODE 0 | $I_1$ | $I_n$ |
| CODE 1 | $I_2$ | $I_{n-1}$ |
| CODE 2 | $I_3$ | $I_{n-2}$ |
| ⋮ | ⋮ | ⋮ |
| CODE n−2 | $I_{n-1}$ | $I_2$ |
| CODE n−1 | $I_n$ | $I_1$ |

(b)

FIG. 28
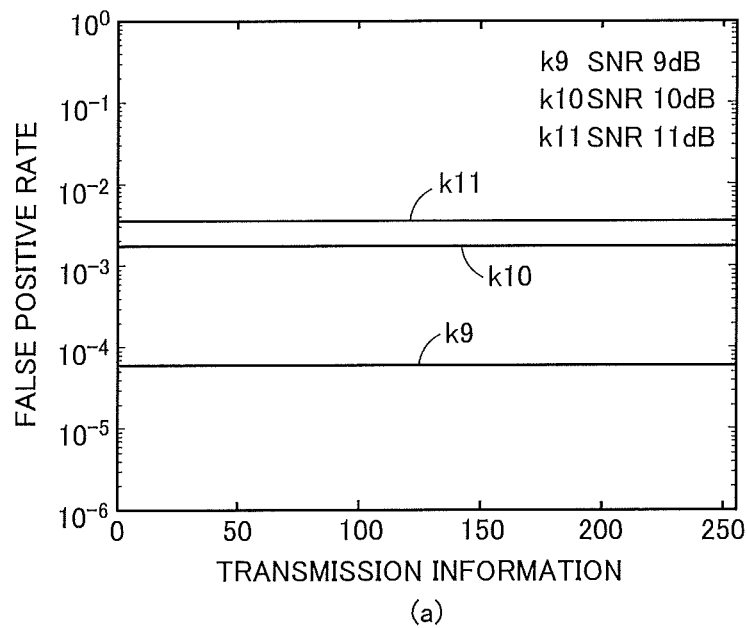
(a)
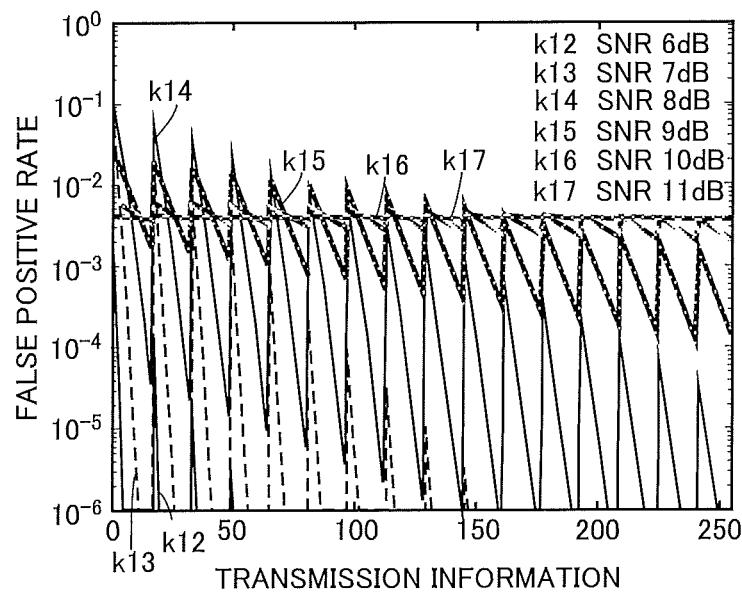
(b)

TRANSMITTER, TRANSMISSION METHOD USED BY THE SAME, RECEIVER FOR RECEIVING A RADIO SIGNAL FROM TRANSMITTER AND WIRELESS COMMUNICATION SYSTEM INCLUDING THE SAME

TECHNICAL FIELD

The present invention relates to a transmitter, a transmission method used by the same, a receiver for receiving a radio signal from the transmitter and a wireless communication system including the same.

BACKGROUND ART

To enable wireless communication using a transmitter for transmitting a wireless local area network (LAN) signal and a receiver operating at a power consumption that is much lower than typical wireless LAN receivers, Non-Patent Document 1 proposes a frame length modulation scheme where a frame length, which is a time length of a radio frame, is associated with information for communication.

In cable or wireless communication, information that is being transmitted may become erroneous due to noise or the like on the transmission path. In wireless communication, a radio signal may be attenuated depending on the transmission distance or be affected by multipath fading, resulting in significant errors in information.

Various coding methods for detecting and correcting errors have been proposed. Non-Patent Document 2 presents basic techniques for detecting and correcting errors, which are generally categorized into two types: one is block coding where codes with fixed length are used for encoding, and the other is convolutional coding where coding depends on past input information.

Non-Patent Document 3 proposes trellis coded modulation, where a modulation technique and an encoding technique are combined. In trellis coded modulation, a modulation technique and an encoding technique are considered together to prevent mismatch of error characteristics in a modulation technique and error detection/correction functionality in a coding technique.

Non-Patent Document 1: Yoshihisa Kondo, et al., "Wake-up Radio using IEEE 802.11 Frame Length Modulation for Radio-On-Demand Wireless LAN", PIMRC 2011, September 2011.

Non-Patent Document 2: W. W. Peterson and E. J. Weldon Jr., "Error-Correcting Codes, Second Edition", The MIT Press.

Non-Patent Document 3: G. Ungerboeck, "Channel Coding with Multilevel/phase Signals", IEEE Trans. IT-28, 1, pp. 55-67.

Non-Patent Document 4: E. H. Armstrong, "Some recent developments of regenerative circuits", Proc. Inst. Radio Eng., Vol. 10, pp. 244-260, August 1922.

DISCLOSURE OF THE INVENTION

However, block coding and convolutional coding described in Non-Patent Document 2 do not take error characteristics of the modulation system into account, and therefore there are no effects to detect and correct errors in frame-length-modulated signals with significantly different error characteristics depending on the modulation value.

In the trellis coded modulation described in Non-Patent Document 3, coding is performed taking into account error characteristics of a modulation system where the time for one modulation (symbol length) is constant. Since the symbol length is not constant in frame length modulation, it is difficult to apply the trellis coded modulation to a frame length modulation scheme.

The present invention was made to solve these problems. An object of the present invention is to provide a transmitter that is capable of reducing transmission errors in wireless communication using frame length modulation.

Another object of the present invention is to provide a transmission method that is capable of reducing transmission errors in wireless communication using frame length modulation.

Yet another object of the present invention is to provide a receiver that is capable of reducing transmission errors in wireless communication using frame length modulation.

Still another object of the present invention is to provide a wireless communication system that is capable of reducing transmission errors in wireless communication using frame length modulation.

According to an embodiment of the present invention, a transmitter includes a generating unit and a transmitting unit. The generating unit assigns at least two different frame lengths to each code in a code sequence that represents transmission information and is represented using a base n (n is an integer not less than 2) to generate a plurality of frame lengths representing the code sequence. The transmitting unit sequentially receives the plurality of frame lengths from the generating unit and sequentially transmits a plurality of radio signals having the received plurality of frame lengths. The generating unit generates a plurality of frame lengths such that a first frame length included in a first plurality of frame lengths representing a first code sequence obtained by converting first transmission information using the base n is greater than a second frame length included in a second plurality of frame lengths representing a second code sequence obtained by converting second transmission information using the base n, the second transmission information being different from the first transmission information, and a third frame length included in the first plurality of frame lengths is smaller than a fourth frame length included in the second plurality of frame lengths. A place in order of the first frame length within the first plurality of frame lengths is equal to a place in order of the second frame length within the second plurality of frame lengths. A place in order of the third frame length within the first plurality of frame lengths is equal to a place in order of the fourth frame length within the second plurality of frame lengths.

According to an embodiment of the present invention, a transmission method includes a first step assigning at least two different frame lengths to each code in a code sequence that represents transmission information and is represented using a base n (n is an integer not less than 2) to generate a plurality of frame lengths representing the code sequence, and a second step sequentially transmitting a plurality of radio signals having the plurality of frame lengths generated in the first step, wherein, in the first step, a plurality of frame lengths are generated such that a first frame length included in a first plurality of frame lengths representing a first code sequence obtained by converting first transmission information using the base n is greater than a second frame length included in a second plurality of frame lengths representing a second code sequence obtained by converting second transmission information to the base n, the second transmission information being different from the first transmission information, and a third frame length included in the first plurality of frame lengths is smaller than a fourth frame length included in the second plurality of frame lengths, and wherein a place in order of the first frame length within the first plurality of frame lengths is equal to a place in order of the second frame length within the second plurality of frame lengths, and a place in order of the third frame length within the first plurality of frame lengths is equal to a place in order of the fourth frame length within the second plurality of frame lengths.

Further, according to an embodiment of the present invention, a receiver is a receiver receiving an even number of radio signals transmitted from the transmitter according to any one of claims 1 to 3, and includes a wave detecting unit, a converting unit and a decoding unit. The wave detecting unit detects reception signals of a plurality of radio signals. The converting unit converts the detection result detected by the detecting unit to digital signals. The decoding unit detects a plurality of frame lengths based on the digital signals and converts the detected plurality of frame lengths into a code sequence to decode transmission information.

Further, according to an embodiment of the present embodiment, a receiver is a receiver receiving the even number of radio signals transmitted from the transmitter according to any one of claims 1 to 3, and includes a wave detecting unit, a converting unit, a detecting unit and a correlating circuit. The wave detecting unit detects reception signals of a plurality of radio signals. The converting unit converts the detection result detected by the wave detecting unit to digital signals. The detecting unit detects a plurality of frame lengths based on the digital signals. The correlating circuit determines whether an arrangement pattern of the detected plurality of frame lengths matches an arrangement pattern of the plurality of frame lengths, and, if it determines that the arrangement pattern of the plurality of frame lengths matches the arrangement pattern of the plurality of frame lengths, outputs a signal indicating that transmission information including a code sequence corresponding to the arrangement pattern of the plurality of frame lengths has been received.

Further, according to an embodiment of the present invention, a wireless communication system includes the transmitter according to any one of claims 1 to 3 and the receiver according to any one of claims 7 to 10.

The transmitter according to an embodiment of the present invention generates a plurality of frame lengths such that a first frame length included in a first plurality of frame lengths is greater than a second frame length included in a second plurality of frame lengths, and a third frame length included in the first plurality of frame lengths is smaller than a fourth frame length included in the second plurality of frame lengths, and sequentially transmits a plurality of radio signals having the generated plurality of frame lengths. As a result, the receiver which receives a plurality of radio signals does not erroneously take the first transmission information for the second transmission information unless it erroneously takes the third frame length for the fourth frame length which is longer than the third frame length. However, in wireless communication, a frame length is rather likely to become erroneous to be taken for a smaller length, and thus the third frame length does not become erroneous to be taken for the fourth frame length.

The transmission errors in transmission information can be reduced.

Further, the transmission method according to an embodiment of the present invention generates a plurality of frame lengths such that a first frame length included in a first plurality of frame lengths is greater than a second frame length included in a second plurality of frame lengths, and a third frame length included in the first plurality of frame lengths is smaller than a fourth frame length included in the second plurality of frame lengths, and sequentially transmits a plurality of radio signals having the generated plurality of frame lengths. As a result, the receiver which receives a plurality of radio signals does not erroneously take the first transmission information for the second transmission information unless it erroneously takes the third frame length for the fourth frame length which is longer than the third frame length. However, in wireless communication, a frame length is rather likely to become erroneous to be taken for a smaller length, and thus the third frame length does not become erroneous to be taken for the fourth frame length.

The transmission errors in transmission information can be reduced.

Further, the receiver according to an embodiment of the present invention receives a plurality of radio signals having a plurality of frame lengths generated such that a first frame length included in a first plurality of frame lengths is greater than a second frame length included in a second plurality of frame lengths, and a third frame length included in the first plurality of frame lengths is smaller than a fourth frame length included in the second plurality of frame lengths, and detects the received plurality of radio signals and then converts them to digital signals to detect a plurality of frame lengths, and obtains transmission information based on the detected plurality of frame lengths. As a result, the first transmission information does not become erroneous to be taken for the second transmission information unless the third frame length is erroneous to be taken for the fourth frame length which is longer than the third frame length. However, in wireless communication, a frame length is rather likely to become erroneous to be taken for a smaller length, and thus the third frame length does not become erroneous to be taken for the fourth frame length.

The transmission errors in transmission information can be reduced.

Further, a wireless communication system according to an embodiment of the present invention will also reduce transmission errors in transmission information by the above mechanism.

BRIEF DESCRIPTION OF THE DRAWINGS

FIG. 4 shows a first specific example for illustrating a method of frame length modulation according to an embodiment of the present invention.

FIG. 5 shows a second specific example for illustrating a method of frame length modulation according to an embodiment of the present invention.

FIG. 6 shows a third specific example for illustrating a method of frame length modulation according to an embodiment of the present invention.

FIG. 7 shows a fourth specific example for illustrating a method of frame length modulation according to an embodiment of the present invention.

FIG. 8 shows a fifth specific example for illustrating a method of frame length modulation according to an embodiment of the present invention.

FIG. 9 shows a sixth specific example for illustrating a method of frame length modulation according to an embodiment of the present invention.

FIG. 10 illustrates generally a method of frame length modulation according to an embodiment of the present invention.

FIG. 28 illustrates the relationship between false positive rate and transmission information.

BEST MODES FOR CARRYING OUT THE INVENTION

Figure 1:
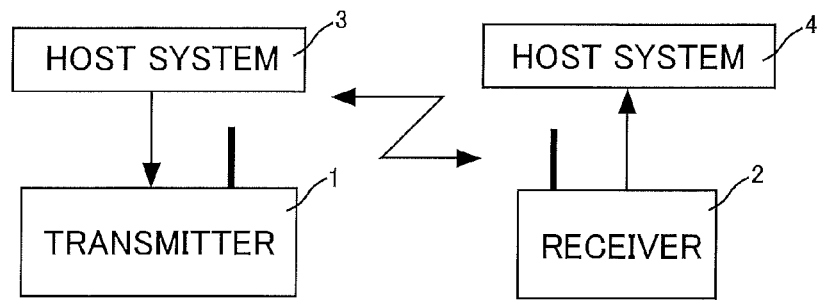
FIG. 1 is a schematic diagram of a configuration of a wireless communication system according to an embodiment of the present invention.

Embodiments of the present invention will be described in detail with reference to the drawings. The same or corresponding parts in the drawings are labeled with the same numerals and their description will not be repeated.

FIG. 1 is a schematic diagram of a configuration of a wireless communication system according to an embodiment of the present invention. Referring to FIG. 1, a wireless communication system 10 according to an embodiment of the present invention includes a transmitter 1 and a receiver 2.

The transmitter 1 receives transmission information from the host system 3 and frame-length-modulates the received transmission information using the methods described below, and transmits the modulated transmission information via wireless communication.

The receiver 2 receives a radio signal transmitted from the transmitter 1 and demodulates the received radio signal using the methods described below. The receiver 2 then outputs the demodulated transmission information to the host system 4.

Figure 2:
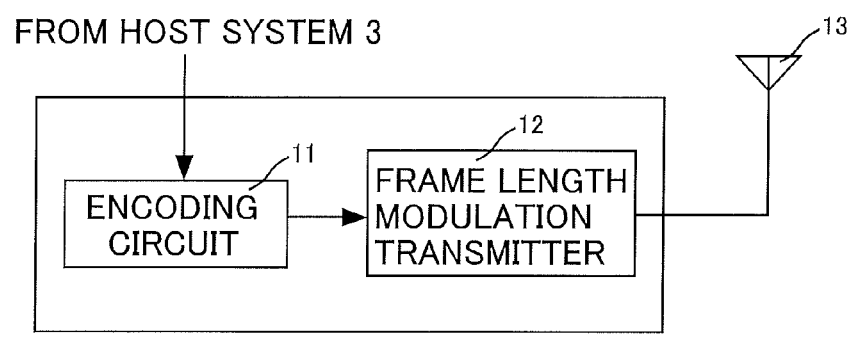
FIG. 2 is a schematic diagram of a configuration of the transmitter shown in FIG. 1.

FIG. 2 is a schematic diagram of a configuration of the transmitter 1 shown in FIG. 1. Referring to FIG. 2, the transmitter 1 includes an encoding circuit 11, a frame length modulation transmitter 12 and an antenna 13.

The encoding circuit 11 receives transmission information from the host system 3. The transmission information is represented by a code sequence using a notation system of base n (n is an integer not less than 2).

The encoding circuit 11 assigns two different frame lengths to each code in a code sequence Cd representing transmission information using the methods described below to generate an even number of frame lengths representing the code sequence Cd. The encoding circuit 11 then sequentially outputs the even number of generated frame lengths to the frame length modulation transmitter 12.

The frame length modulation transmitter 12 sequentially receives the even number of frame lengths from the encoding circuit 11. The frame length modulation transmitter 12 then generates an even number of radio signals having the received even number of frame lengths, and transmits the generated even number of radio signals via the antenna 13.

Figure 3:
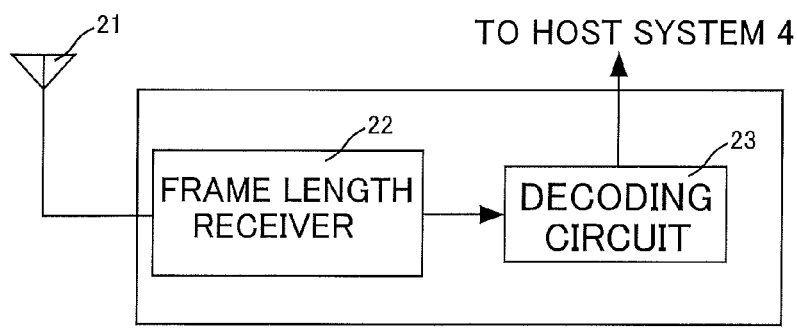
FIG. 3 is a schematic diagram of a configuration of the receiver shown in FIG. 1.

FIG. 3 is a schematic diagram of a configuration of the receiver 2 shown in FIG. 1. Referring to FIG. 3, the receiver 2 includes an antenna 21, a frame length receiver 22 and a demodulating circuit 23.

The frame length receiver 22 receives a radio signal via the antenna 21, detects an envelope of the received radio signal and converts the detected envelope into a digital signal. The frame length receiver 22 then detects a plurality of frame lengths based on the converted digital signal and outputs the detected plurality of frame lengths to the demodulating circuit 23.

The demodulating circuit 23 demodulates the plurality of frame lengths received from the frame length receiver 22 into a code sequence using the methods described below, and outputs the demodulated code sequence to the host system 4.

The frame length modulation scheme according to an embodiment of the present invention will be described. The encoding circuit 11 of the transmitter 1 receives transmission information from the host system 3. The number of types of transmission information will be denoted by m (m is an integer not less than 2), the information to be transmitted will be denoted by k=0, 1, 2, 3, ..., m−1, x=Ceil($\log_n m$) is satisfied. Ceil(y) means the smallest integer not less than y. Thus, Ceil($\log_n m$) is an integer not less than the calculation result of $\log_n m$.

Consequently, in the case that the transmission information k is converted to a base n (n is an integer not less than 2), the transmission information k may be given by the following equation:

$$k = a_{x-1} n^{x-1} + a_{x-2} n^{x-2} + \ldots + a_2 n^2 + a_1 n + a_0 \qquad (1).$$

In Equation (1), $a_i$=0, 1, 2, ..., n−1 (i=0, 1, 2, ..., x−1).

Therefore, if transmission information k is converted to the base n, the transmission information k is represented by a sequence of x codes $[a_{x-1} a_{x-2} \ldots a_1 a_0]$.

Then, in an embodiment of the present invention, two different frame lengths are assigned to each code $a_i$ of the code sequence $[a_{x-1} a_{x-2} \ldots a_1 a_0]$. That is, the code $a_i$ is represented by two different frame lengths.

Specific description will be given below.

FIG. 4 shows a first specific example for illustrating a method of frame length modulation according to an embodiment of the present invention.

FIG. 4 illustrates a method of frame length modulation in the case that the number m of types of transmission information is 4, the transmission information k are "0", "1", "2" and "3", and the transmission information k is converted to a binary system.

FIG. 4(a) shows the correspondence between the transmission information k (="0", "1", "2" and "3") and the code sequence obtained by converting the transmission information k to the binary system, and FIG. 4(b) shows a table TBL1 including the correspondence between the codes in the binary system and two frame lengths assigned to each code.

If m=4 transmission information k (="0", "1", "2" and "3") are converted to the binary system, x=Ceil($\log_2 4$)=2 is true. Consequently, each type of the transmission information k (="0", "1", "2" or "3") is represented by a sequence of two codes (=a first code and a second code), as shown in FIG. 4(a). More specifically, the transmission information "0", "1", "2" and "3" are represented by the code sequences [0,0], [0,1], [1,0] and [1, 1], respectively.

In the binary system, two types of code, "0" and "1", may be used such that the frame lengths used for frame length modulation may be, for example, two types of 560 μs and 600 μs. This two types of frame lengths may be selected from a plurality of frame lengths used in wireless local area network (LAN).

Then, the two different frame lengths of 560 μs and 600 μs are assigned to the code "0", and the two different frame lengths 600 μs and 560 μs are assigned to the code "1". As a result, the frame length of the first frame of the code "0", 560 μs, is smaller than the frame length of the first frame of the code "1", 600 μs, and the frame length of the second frame of the code "0", 600 μs, is greater than the frame length of the second frame of the code "1", 560 μs (see FIG. 4(b)).

Thus, in an embodiment of the present invention, for two types of codes (=0,1) in the binary system, the frame length of the first frame assigned to one code (=0) is smaller than the frame length of the first frame assigned to the other code (=1), and the frame length of the second frame assigned to one code (=0) is greater than the frame length of the second frame assigned to the other code (=1). To realize these relationships, the table TBL1 is constituted such that frame lengths arranged in ascending order are assigned to the first frames, while frame lengths arranged in descending order are assigned to the second frames.

It should be understood that the table TBL1 may be constituted such that frame lengths arranged in descending order are assigned to the first frames, while frame lengths arranged in ascending order are assigned to the second frames. In such implementations, for two codes in the binary system, the frame length of the first frame assigned to one code (=0) is greater than the frame length of the first frame assigned to the other code (=1), while the frame length of the second frame assigned to one code (=0) is smaller than the frame length of the second frame assigned to the other code (=1).

If the transmission information "0" is to be frame-length-modulated, the two frame lengths 560 μs and 600 μs are assigned to its first code, i.e. code "0", and the two frame lengths 560 μs and 600 μs are assigned to its second code, i.e. code "0". If the transmission information "1" is to be frame-length-modulated, the two frame lengths 560 μs and 600 μs are assigned to its first code, i.e. code "0", and the two frame lengths 600 μs and 560 μs are assigned to its second code, i.e. code "1". Similar procedures apply to the transmission information "2" and "3". As a result, the transmission information "0" is frame-length-modulated to [560 μs, 600 μs, 560 μs, 600 μs]; the transmission information "1" is frame-length-modulated to [560 μs, 600 μs, 600 μs, 560 μs]; the transmission information "2" is frame-length-modulated to [600 μs, 560 μs, 560 μs, 600 μs]; and the transmission information "3" is frame-length-modulated to [600 μs, 560 μs, 600 μs, 560 μs].

The encoding circuit 11 of the transmitter 1 incorporates the table TBL1, and refers to the table TBL1 and assigns two frame lengths to each of the first and second codes that constitute the transmission information "0", "1", "2" and "3" to frame-length-modulate the transmission information "0", "1", "2" and "3".

Thus, in the case that the transmission information k is converted to the binary system, each of the transmission information "0", "1", "2" and "3" is represented by four (=2x) frame lengths.

When an error occurs in frame length in wireless communication, the frame length is rather likely to become erroneous to be taken for a smaller length. Thus, if the frame lengths shown in Table TBL1 are assigned to the two codes "0" and "1", the code "0" becomes erroneous to be taken for the code "1" when the frame length of the second frame of the code "0", 600 μs, is erroneous to be taken for the frame length 560 μs and the frame length of the first frame of the code "0", 560 μs, is erroneous to be taken for the frame length 600 μs. However, in wireless communication, since the frame length is rather likely to become erroneous to be taken for a smaller length, the frame length of the first frame of the code "0", 560 μs, is unlikely to become erroneous to be taken for the frame length 600 μs. Therefore, transmission errors are reduced.

FIG. 5 shows a second specific example for illustrating a method of frame length modulation according to an embodiment of the present invention.

FIG. 5 illustrates a method of frame length modulation in the case that the number m of types of transmission information is 4, the transmission information k are "0", "1", "2" and "3", and the transmission information k is converted to a quaternary system.

FIG. 5(a) shows the correspondence between the transmission information k (="0", "1", "2" and "3") and the code sequences obtained by converting the transmission information k to the quaternary system, and FIG. 5(b) shows a table TBL2-1 including the correspondence between the codes in the quaternary system and two frame lengths assigned to each code. FIG. 5 (c) to (e) show tables TBL2-2 to TBL2-4 including the correspondences between the codes in the quaternary system and three frame lengths assigned to each code.

If m=4 transmission information k (="0", "1", "2" and "3") are converted to the quaternary system, x=Ceil($\log_4 4$)=1 is true. Consequently, each of the transmission information k (="0", "1", "2" or "3") is represented by a sequence of one code (=a first code), as shown in FIG. 5(a). More specifically, the transmission information "0", "1", "2" and "3" are represented by the code sequences [0], [1], [2] and [3], respectively.

Since in the quaternary system, four types of code, "0", "1", "2" and "3", are used, the frame lengths used for frame length modulation are, for example, 480 μs, 520 μs, 560 μs and 600 μs. This four frame lengths are arbitrarily selected from a plurality of frame lengths used in wireless LAN.

Then, if two different frame lengths are assigned to each of the codes "0", "1", "2" and "3", the two different frame lengths 480 μs and 600 μs are assigned to the code "0", the two different frame lengths 520 μs and 560 μs are assigned to the code "1", the two different frame lengths 560 μs and 520 μs are assigned to the code "2" and the two different frame lengths 600 μs and 480 μs are assigned to the code "3" (see FIG. 5(b)). As a result, for two arbitrary codes out of a plurality of codes (="0", "1", "2" and "3") in the quaternary system, the frame length of the first frame assigned to one code is smaller than the frame length of the first frame assigned to the other code, and the frame length of the second frame assigned to one code is greater than the frame length of the second frame assigned to the other code. To realize these relationships, the table TBL2-1 is constituted such that frame lengths arranged in ascending order are assigned to the first frames, while frame lengths arranged in descending order are assigned to the second frames.

It should be understood that the table TBL2-1 may be constituted such that frame lengths arranged in descending order are assigned to the first frames, while frame lengths arranged in ascending order are assigned to the second frames. In such implementations, for two arbitrary codes in the quaternary system, the frame length of the first frame assigned to one code is greater than the frame length of the first frame assigned to the other code, while the frame length of the second frame assigned to one code is smaller than the frame length of the second frame assigned to the other code.

Therefore, as described above, transmission errors are reduced.

If the transmission information "0" is to be frame-length-modulated, the two frame lengths 480 µs and 600 µs are assigned to its first code, i.e. code "0". If the transmission information "1" is to be frame-length-modulated, the two frame lengths 520 µs and 560 µs are assigned to its first code, i.e. code "1". Similar procedures apply to the transmission information "2" and "3". As a result, the transmission information "0" is frame-length-modulated to [480 µs, 600 µs]; the transmission information "1" is frame-length-modulated to [520 µs, 560 µs]; the transmission information "2" is frame-length-modulated to [560 µs, 520 µs]; and the transmission information "3" is frame-length-modulated to [600 µs, 480 µs].

The encoding circuit 11 of the transmitter 1 incorporates the table TBL2-1, and refers to the table TBL2-1 and assigns two frame lengths to each of the first codes that constitute the transmission information "0", "1", "2" and "3" to frame-length-modulate the transmission information "0", "1", "2" and "3".

If three different frame lengths are to be assigned to each of the codes "0", "1", "2" and "3", the three different frame lengths 480 µs, 600 µs and 540 µs are assigned to the code "0"; the three different frame lengths 520 µs, 560 µs and 540 µs are assigned to the code "1"; the three different frame lengths 560 µs, 520 µs and 540 µs are assigned to the code "2"; and the three different frame lengths 600 µs, 480 µs and 540 µs are assigned to the code "3" (see FIG. 5(c)). As a result, for two arbitrary ones out of a plurality of codes (="0", "1", "2" and "3") in the quaternary system, the frame length of the first frame assigned to one code is smaller than the frame length of the first frame assigned to the other code, while the frame length of the second frame assigned to one code is greater than the frame length of the second frame assigned to the other code. To realize these relationships, the table TBL2-2 is constituted such that frame lengths arranged in ascending order are assigned to the first frames, frame lengths arranged in descending order are assigned to the second frames, and the average value of the frame length of a first frame and the frame length of a second frame is assigned to a third frame.

It should be understood that the table TBL2-2 may be constituted such that frame lengths arranged in descending order are assigned to the first frames, frame lengths arranged in ascending order are assigned to the second frames, and the average value of the frame length of a first frame and the frame length of a second frame is assigned to a third frame. In such implementations, for two arbitrary codes in the quaternary system, the frame length of the first frame assigned to one code is greater than the frame length of the first frame assigned to the other code, and the frame length of the second frame assigned to one code is smaller than the frame length of the second frame assigned to the other code.

Therefore, as described above, transmission errors are reduced.

If the transmission information "0" is to be frame-length-modulated, the three frame lengths 480 µs, 600 µs and 540 µs are assigned to its first code, i.e. code "0". If the transmission information "1" is to be frame-length-modulated, the three frame lengths of 520 µs, 560 µs and 540 us are assigned to its first code, i.e. code "1". Similar procedures apply to the transmission information "2" and "3". As a result, the transmission information "0" is frame-length-modulated to [480 µs, 600 µs, 540 µs]; the transmission information "1" is frame-length-modulated to [520 µs, 560 µs, 540 µs]; the transmission information "2" is frame-length-modulated to [560 µs, 520 µs, 540 µs]; and the transmission information "3" is frame-length-modulated to [600 µs, 480 µs, 540 µs].

The encoding circuit 11 of the transmitter 1 incorporates the table TBL2-2, and refers to the table TBL2-2 and assigns three frame lengths to each of the first codes that constitute the transmission information "0", "1", "2" and "3" to frame-length-modulate the transmission information "0", "1", "2" and "3".

If three different frame lengths are to be assigned to each of the codes "0", "1", "2" and "3", three different frame lengths may be assigned to each of the codes "0", "1", "2" and "3" in accordance with one of the tables TBL2-3 and TBL2-4 (see (c) and (d) of FIG. 5).

The table TBL2-3 is constituted such that frame lengths arranged in ascending order are assigned to the first frames, frame lengths arranged in descending order are assigned to the third frames, and the average value of the frame length of the first frame and the frame length of the third frame is assigned to the second frames.

It should be understood that the table TBL2-3 may be constituted such that frame lengths arranged in descending order are assigned to the first frames, frame lengths arranged in ascending order are assigned to the third frames, and the average value of the frame length of the first frame and the frame length of the third frame is assigned to the second frames.

Further, the table TBL2-4 is constituted such that frame lengths arranged in ascending order are assigned to the second frames, frame lengths arranged in descending order are assigned to the third frames, and the average value of the frame length of the second frame and the frame length of the third frame is assigned to the first frames.

It should be understood that the table TBL2-4 may be constituted such that frame lengths arranged in descending order are assigned to the second frames, frame lengths arranged in ascending order are assigned to the third frames, and the average value of the frame length of a second frame and the frame length of a third frame is assigned to a first frame.

If the table TBL2-3 or TBL2-4 is used to assign three different frame lengths to each of the codes "0", "1", "2" and "3", the encoding circuit 11 of the transmitter 1 incorporates the table TBL2-3 or TBL2-4, and refers to the table TBL2-3 or TBL2-4 and, in a similar manner to that for referring to the table TBL2-2, assigns three frame lengths to each of the first codes that constitute the transmission information "0", "1", "2" and "3" to frame-length-modulate the transmission information "0", "1", "2" and "3".

Generally, if three different frame lengths are assigned to each of the codes "0", "1", "2" and "3", for two frames arbitrarily selected from the first to three frames, frame lengths arranged in ascending order are assigned to one of the two frames, frame lengths arranged in descending order are assigned to the other one of the two frames, and an arbitrary frame length is assigned to the remaining frame.

The table TBL2-2 is an example where the average value of the frame length of the first frame and the frame length of the second frame is assigned to the remaining frames, i.e. the third frames; the table TBL2-3 is an example where the average value of the frame length of the first frame and the frame length of the third frame is assigned to the remaining frames, i.e. the second frames; and the table TBL2-4 is an example where the average value of the frame length of the second frame and the frame length of the third frame is assigned to the remaining frames, i.e. the first frames. Since the frame length assigned to the remaining frames may be any frame length, different frame lengths may be assigned to the third frames of the table TBL2-2, different frame lengths may be assigned to the second frames of the table TBL2-3, and different frame lengths may be assigned to the first frames of the table TBL2-4.

Four or more different frame lengths may be assigned to each of the codes "0", "1", "2" and "3". In this case, a plurality of frames corresponding to the codes "0", "1", "2" and "3" suitably include at least one of combinations of one frame to which frame lengths arranged in ascending order are assigned and one frame to which frame lengths arranged in descending order are assigned.

Thus, if transmission information k is converted to the quaternary system, each of the transmission information "0", "1", "2" and "3" is represented by 2 (=2x) or more frame lengths.

FIG. 6 shows a third specific example for illustrating a method of frame length modulation according to an embodiment of the present invention.

FIG. 6 illustrates a method of frame length modulation in the case that the number m of types of transmission information is 4, the transmission information k are "0", "1", "2" and "3", and the transmission information k is converted to an octonary system.

FIG. 6 (a) to (d) show the correspondence between the transmission information k (="0", "1", "2" and "3") and the code sequences obtained by converting the transmission information k to the octonary system, and FIG. 6(e) shows a table TBL3 including the correspondence between the codes in the octonary system and two frame lengths assigned to each code.

If m=4 transmission information k (="0", "1", "2" and "3") are converted to the octonary system, x=Ceil($\log_{84}$)=1 is true. Consequently, each of the transmission information k (="0", "1", "2" and "3") is represented by a sequence of one code (=a first code), as shown in FIG. 6 (a) to (d). More specifically, the transmission information "0", "1", "2" and "3" may be represented by the code sequences [0], [1], [2] and [3], respectively (see FIG. 6(a)), may be represented by the code sequences [4], [5], [6] and [7], respectively (see FIG. 6(b)), may be represented by the code sequences [0], [2], [4] and [6], respectively (see FIG. 6(c)), or may be represented by the code sequences [0], [1], [6] and [7], respectively (see FIG. 6(d)).

In the octonary system, eight codes, "0", "1", "2", "3", "4", "5", "6" and "7", are used, and each of the four transmission information k (="0", "1", "2" and "3") is represented by a sequence of one code (=a first code). Thus, each of four transmission information k (="0", "1", "2" and "3") is generally represented by four codes arbitrarily selected from the 8 codes, "0", "1", "2", "3", "4", "5", "6", and "7".

Thus, the correspondences between the transmission information k and the code sequence obtained by converting the transmission information k to the octonary system shown in FIG. 6 (a) to (d) are exemplary; in an embodiment of the present invention, to convert transmission information k to the octonary system, correspondences other than those shown in FIG. 6 (a) to (d) may be employed.

In the octonary system, since eight codes, "0", "1", "2", "3", "4", "5", "6" and "7", may be used, the frame lengths used for frame length modulation may be, for example, eight types of 480 μs, 640 μs, 800 μs, 960 μs, 1120 μs, 1280 μs, 1440 μs, and 1600 μs. This eight types of frame lengths may be arbitrarily selected from a plurality of frame lengths used in wireless LAN.

Then, the two different frame lengths 1600 μs and 480 μs are assigned to the code "0"; the two different frame lengths 1440 μs and 640 μs are assigned to the code "1"; the two different frame lengths 1280 μs and 800 μs are assigned to the code "2"; the two different frame lengths 1120 μs and 960 μs are assigned to the code "3"; the two different frame lengths 960 μs and 1120 μs are assigned to the code "4"; the two different frame lengths 800 μs and 1280 μs are assigned to the code "5"; the two different frame lengths 640 μs and 1440 μs are assigned to the code "6"; and the two different frame lengths 480 μs and 1600 μs are assigned to the code "7" (see FIG. 6(e)).

As a result, for two arbitrary codes out of a plurality of codes (="0", "1", "2", "3", "4", "5", "6" and "7") in the quaternary system, the frame length of the first frame assigned to one code is smaller than the frame length of the first frame assigned to the other code, and the frame length of the second frame assigned to one code is greater than the frame length of the second frame assigned to the other code. To realize these relationships, the table TBL3 is constituted such that frame lengths arranged in descending order are assigned to the first frames and frame lengths arranged in ascending order are assigned to the second frames.

It should be understood that the table TBL3 may be constituted such that frame lengths arranged in ascending order are assigned to the first frames and frame lengths arranged in descending order are assigned to the second frames. In such implementations, for two arbitrary codes in the octonary system, the frame length of the first frame assigned to one code is greater than the frame length of the first frame assigned to the other code, while the frame length of the second frame assigned to one code is smaller than the frame length of the second frame assigned to the other code.

Therefore, as described above, transmission errors are reduced.

If the correspondence between the transmission information k and the code sequence obtained by converting the transmission information k to the octonary system shown in FIG. 6(a) is used, the transmission information "0", "1", "2" and "3" are frame-length-modulated in the following manner: if the transmission information "0" is frame-length-modulated, the two frame lengths 1600 μs and 480 μs are assigned to its first code, i.e. code "0"; if the transmission information "1" is frame-length-modulated, the two frame lengths 1440 μs and 640 μs are assigned to its first code, i.e. code "1"; and similar procedures apply to the transmission information "2" and "3". As a result, the transmission information "0" is frame-length-modulated to [1600 μs, 480 μs]; the transmission "1" is frame-length-modulated to [1440 μs, 640 μs]; the transmission information "2" is frame-length-modulated to [1280 μs, 800 μs]; and the transmission information "3" is frame-length-modulated to [1120 μs, 960 μs]. Similar procedures apply to implementations where the correspondence shown in one of FIG. 6 (b) to (d) is used.

The encoding circuit 11 of the transmitter 1 incorporates the table TBL3, and refers to the table TBL3 and assigns two frame lengths to each of the first codes that constitute the transmission information "0", "1", "2" and "3" to frame-length-modulate the transmission information "0", "1", "2" and FIG. 6 only shows implementations where two frame lengths are assigned to the code of each of "0", "1", "2" and "3"; however, three or more frame lengths may be assigned to the code of each of "0", "1", "2" and "3", as shown in FIG. 5.

Thus, if transmission information k is converted to the octonary system, each of the transmission information "0", "1", "2" and "3" is represented by 2 (=2x) or more frame lengths.

If the transmission information k is converted to the octonary system such that the transmission information k is represented by one code (=first code), the maximum number m of types of the transmission information k is 8 since eight codes are used in the octonary system.

FIG. 7 shows a fourth specific example for illustrating a method of frame length modulation according to an embodiment of the present invention.

FIG. 7 illustrates a method of frame length modulation in the case that the number m of types of the transmission information is 256, the transmission information k are "0", "1", "2", "3", . . . , "252", "253", "254" and "255", and the transmission information k is converted to a hexadecimal system.

FIG. 7(a) shows the correspondence between the transmission information k (="0" to "255") and the code sequence obtained by converting the transmission information k to the hexadecimal system, and FIG. 7(b) shows a table TBL4 including the correspondence between the codes in the hexadecimal system and two frame lengths assigned to each code.

If m=256 the transmission information k (="0" to "255") are converted to the hexadecimal system, x= Ceil($\log_{16}$256)=2 is true. Consequently, each type of the transmission information k (="0" to "255") is represented by a sequence of two codes (=a first code and second code), as shown in FIG. 7(a). More specifically, the transmission information "0" is represented by the code sequence [0,0]; the transmission information "1" is represented by the code sequence [0,1]; the transmission information "2" is represented by the code sequence [0,2]; the transmission information "3" is represented by the code sequence [0,3]; and so forth, and; the transmission information "252" is represented by the code sequence [15,12]; the transmission information "253" is represented by the code sequence [15,13]; the transmission information "254" is represented by the code sequence [15,14]; and the transmission information "255" is represented by the code sequence [15,15].

Since in the hexadecimal system, 16 codes, "0" to "15", may be used, the frame lengths used for frame length modulation may be, for example, 16 types of 480 μs, 640 μs, 800 μs, 960 μs, 1120 μs, 1280 μs, 1440 μs, 1600 μs, 1760 μs, 1920 μs, 2080 μs, 2240 μs, 2400 μs, 2560 μs, 2720 μs and 2880 μs. This 16 types of frame lengths may be arbitrarily selected from a plurality of frame lengths used in wireless LAN.

Then, the two different frame lengths 480 μs and 2880 μs; 640 μs and 2720 μs; 800 μs and 2560 μs; 960 μs and 2400 μs; 1120 μs and 2240 μs; 1280 μs and 2080 μs; 1440 μs and 1920 μs; 1600 μs and 1760 μs; 1760 μs and 1600 μs; 1920 μs and 1440 μs; 2080 μs and 1280 μs; 2240 μs and 1120 μs; 2400 μs and 960 μs; 2560 μs and 800 μs; 2720 μs and 640 μs; or 2880 μs and 480 ms are assigned to the codes "0" to "15", respectively (see FIG. 7(b)).

As a result, for two arbitrary codes out of a plurality of codes (="0" to "15") in the hexadecimal system, the frame length of the first frame assigned to one code is smaller than the frame length of the first frame assigned to the other code, and the frame length of the second frame assigned to one code is greater than the frame length of the second frame assigned to the other code. To realize these relationships, the table TBL4 is constituted such that frame lengths arranged in ascending order are assigned to the first frames, and frame lengths arranged in descending order are assigned to the second frames.

It should be understood that the table TBL4 may be constituted such that frame lengths arranged in descending order are assigned to the first frames, and frame lengths arranged in ascending order are assigned to the second frames. In such implementations, for two arbitrary codes in the hexadecimal system, the frame length of the first frame assigned to one code is greater than the frame length of the first frame assigned to the other code, while the frame length of the second frame assigned to one code is smaller than the frame length of the second frame assigned to the other code.

Therefore, as described above, transmission errors are reduced.

If the transmission information "0" is frame-length-modulated, the two frame lengths 480 μs and 2880 μs are assigned to its first code, i.e. code "0", and the two frame lengths 480 μs and 2880 μs are assigned to its second code, i.e. code "0". If the transmission information "1" is frame-length-modulated, the two frame lengths 480 μs and 2880 μs are assigned to its first code, i.e. code "0", and the two frame lengths 640 μs and 2720 μs are assigned to its second code, i.e. code "0". Similar procedures apply to the transmission information "2" to "255". As a result, the transmission information "0" is frame-length-modulated to [480 μs, 2880 μs, 480 μs, 2880 μs]; the transmission information "1" is frame-length-modulated to [480 μs, 2880 μs, 640 μs, 2720 μs]; and so forth, and; the transmission information "254" is frame-length-modulated to [2880 μs, 480 μs, 2720 μs, 640 μs]; and the transmission information "255" is frame-length-modulated to [2880 μs, 480 μs, 2880 μs, 480 μs].

The encoding circuit 11 of the transmitter 1 incorporates the table TBL4, and refers to the table TBL4 and assigns two frame lengths to each of the first and second codes that constitute the transmission information "0" to "255" to frame-length-modulate the transmission information "0" to "255".

Thus, if the transmission information k is converted to the hexadecimal system, each of the transmission information "0" to "255" is represented by 4 (=2x) frame lengths.

FIG. 8 shows a fifth specific example for illustrating a method of frame length modulation according to an embodiment of the present invention.

FIG. 8 illustrates a method of frame length modulation in the case that the number m of types of the transmission information is 256, the transmission information k are "0", "1", "2", "3", . . . , "252", "253", "254" and "255", and the transmission information k is converted to the quaternary system.

FIG. 8(a) shows the correspondence between the transmission information k (="0" to "255") and the code sequence obtained by converting the transmission information k to the quaternary system, and FIG. 8(b) shows a table TBL5 including the correspondence between the codes in the quaternary system and two frame lengths assigned to each code.

If m=256 transmission information k (="0" to "255") are converted to the quaternary system, x=Ceil($\log_4$256)=4 is true. Consequently, each of the transmission information k (="0" to "255") is represented by a code sequence composed of four codes (=first, second, third and fourth codes), as shown in FIG. 8(a). More specifically, the transmission information "0" is represented by the code sequence [0,0,0,0]; the transmission information "1" is represented by the code sequence [0,0,0,1]; the transmission information "2" is represented by the code sequence [0,0,0,2]; the transmission information "3" is represented by the code sequence [0,0,0, 3]; and so forth, and; the transmission information "252" is represented by the code sequence [3,3,3,0]; the transmission information "253" is represented by the code sequence [3,3, 3,1]; the transmission information "254" is represented by the code sequence [3,3,3,2]; and the transmission information "255" is represented by the code sequence [3,3,3,3].

Since in the quaternary system, four codes, "0" to "3", may be used, the frame lengths used for frame length modulation may be, for example, four types of 480 µs, 520 µs, 560 µs and 600 µs. This four types of frame lengths may be arbitrarily selected from a plurality of frame lengths used in wireless LAN.

Then, the two different frame lengths 480 µs and 600 µs are assigned to the code "0"; the two different frame lengths 520 µs and 560 µs are assigned to the code "1"; the two different frame lengths 560 µs and 520 µs are assigned to the code "2"; and the two different frame lengths 600 µs and 480 µs are assigned to the code "3" (see FIG. 8(b)).

As a result, for two arbitrary codes out of a plurality of codes (="0" to "3") in the quaternary system, the frame length of the first frame assigned to one code is smaller than the frame length of the first frame assigned to the other code, and the frame length of the second frame assigned to one code is greater than the frame length of the second frame assigned to the other code. To realize these relationships, the table TBL5 is constituted such that frame lengths arranged in ascending order are assigned to the first frames and frame lengths arranged in descending order are assigned to the second frames.

It should be understood that the table TBL5 may be constituted such that frame lengths arranged in descending order are assigned to the first frames and frame lengths arranged in ascending order are assigned to the second frames. In such implementations, for two arbitrary codes in the quaternary system, the frame length of the first frame assigned to one code is greater than the frame length of the first frame assigned to the other code, while the frame length of the second frame assigned to one code is smaller than the frame length of the second frame assigned to the other code.

Therefore, as described above, transmission errors are reduced.

If the transmission information "0" is frame-length-modulated, the two frame lengths 480 µs and 600 µs are assigned to its first code, i.e. code "0", the two frame lengths 480 µs and 600 µs are assigned to its second code, i.e. code "0", the two frame lengths 480 µs and 600 µs are assigned to its third code, i.e. code "0", and the two frame lengths 480 µs and 600 µs are assigned to its fourth code, i.e. code "0".

If the transmission information "1" is frame-length-modulated, the two frame lengths 480 µs and 600 µs are assigned to its first code, i.e. code "0", the two frame lengths 480 µs and 600 µs are assigned to its second code, i.e. code "0", the two frame lengths 480 µs and 600 µs are assigned to its third code, i.e. code "0", and the two frame lengths 520 µs and 560 µs are assigned to its fourth code, i.e. code "1". Similar procedures apply to the transmission information "2" to "255" (see FIG. 8(b)).

As a result, the transmission information "0" is frame-length-modulated to [480 µs, 600 µs, 480 µs, 600 µs, 480 µs, 600 µs, 480 µs, 600 µs]; the transmission information "1" is frame-length-modulated to [480 µs, 600 µs, 480 µs, 600 µs, 480 µs, 600 µs, 520 µs, 560 µs]; and so forth, and; the transmission information "254" is frame-length-modulated to [600 µs, 480 µs, 600 µs, 480 µs, 680 µs, 480 µs, 560 µs, 520 µs]; and the transmission information "255" is frame-length-modulated to [600 µs, 480 µs, 600 µs, 480 µs, 600 µs, 480 µs, 600 µs, 480 µs].

The encoding circuit 11 of the transmitter 1 incorporates the table TBL5, and refers to the table TBL5 and assigns two frame lengths to each of the first, second, third and fourth codes that constitute the transmission information "0" to "255" to frame-length-modulate the transmission information "0" to "255".

Thus, if the transmission information k is converted to the quaternary system, each of the transmission information "0" to "255" is represented by 8 (=2x) frame lengths.

FIG. 9 shows a sixth specific example for illustrating a method of frame length modulation according to an embodiment of the present invention.

FIG. 9 illustrates a method of frame length modulation in the case that the number m of types of the transmission information is 256, the transmission information k are "0", "1", "2", "3", ..., "252", "253", "254" and "255", and the transmission information k is converted to the binary system.

FIG. 9(a) shows the correspondence between the transmission information k (="0" to "255") and the code sequence obtained by converting the transmission information k to the binary system, while FIG. 9(b) shows a table TBL6 including the correspondence between the codes in the binary system and two frame lengths assigned to each code.

If m=256 transmission information k (="0" to "255") are converted to the binary system, x=Ceil($\log_2 256$)=8 is true. Consequently, each of the transmission information k (="0" to "255") is represented by a code sequence composed of eight codes (=first, second, third, fourth, fifth, sixth, seventh and eighth codes), as shown in FIG. 9(a). More specifically, the transmission information "0" is represented by the code sequence [0,0,0,0,0,0,0,0]; the transmission information "1" is represented by the code sequence [0,0,0,0,0,0,0,1]; the transmission information "2" is represented by the code sequence [0,0,0,0,0,0,1,0]; the transmission information "3" is represented by the code sequence [0,0,0,0,0,0,1,1]; and so forth, and; the transmission information "252" is represented by the code sequence [1,1,1,1,1,1,0,0]; the transmission information "253" is represented by the code sequence [1,1, 1,1,1,1,0,1]; the transmission information "254" is represented by the code sequence [1,1,1,1,1,1,1,0]; and the transmission information "255" is represented by the code sequence [1,1,1,1,1,1,1,1].

Since in the binary system, two types of code, "0" and "1", may be used, the frame lengths used for frame length modulation may be, for example, two types of 560 µs and 600 µs. This two types of frame lengths may be arbitrarily selected from a plurality of frame lengths used in wireless LAN.

Then, the two different frame lengths 560 µs and 600 µs are assigned to the code "0", and the two different frame lengths 600 µs and 560 µs are assigned to the code "1" (see FIG. 9(b)).

As a result, for two codes (="0" and "1") in the binary system, the frame length of the first frame assigned to one code is smaller than the frame length of the first frame assigned to the other code, and the frame length of the second frame assigned to one code is greater than the frame length of the second frame assigned to the other code. To realize these relationships, the table TBL6 is constituted such that frame lengths arranged in ascending order are assigned to the first frames, and frame lengths arranged in descending order are assigned to the second frames.

It should be understood that the table TBL6 may be constituted such that frame lengths arranged in descending order are assigned to the first frames and frame lengths arranged in ascending order are assigned to the second frames. In such implementations, for two codes in the binary system, the frame length of the first frame assigned to one code is greater than the frame length of the first frame assigned to the other code, while the frame length of the second frame assigned to one code is smaller than the frame length of the second frame assigned to the other code.

Therefore, as described above, transmission errors are reduced.

If the transmission information "0" is frame-length-modulated, the two frame lengths 560 μs and 600 μs are assigned to its first code, i.e. code "0", the two frame lengths 560 μs and 600 μs are assigned to its second code, i.e. code "0", the two frame lengths 560 μs and 600 μs are assigned to its third code, i.e. code "0", the two frame lengths 560 μs and 600 μs are assigned to its fourth code, i.e. code "0", the two frame lengths 560 μs and 600 μs are assigned to its fifth code, i.e. code "0", the two frame lengths 560 μs and 600 μs are assigned to its sixth code, i.e. code "0", the two frame lengths 560 μs and 600 μs are assigned to its seventh code, i.e. code "0", and the two frame lengths 560 μs and 600 μs are assigned to its eighth code, i.e. code "0".

If the transmission information "1" is frame-length-modulated, the two frame lengths 560 μs and 600 μs are assigned to its first code, i.e. code "0", the two frame lengths 560 μs and 600 μs are assigned to its second code, i.e. code "0", the two frame lengths 560 μs and 600 μs are assigned to its third code, i.e. code "0", the two frame lengths 560 μs and 600 μs are assigned to its fourth code, i.e. code "0", the two frame lengths 560 μs and 600 μs are assigned to its fifth code, i.e. code "0", the two frame lengths 560 μs and 600 us are assigned to its sixth code, i.e. code "0", the two frame lengths 560 μs and 600 μs are assigned to its seventh code, i.e. code "0", and the two frame lengths 600 μs and 560 μs are assigned to its eighth code, i.e. code "1". Similar procedures apply to the transmission information "2" to "255".

As a result, the transmission information "0" is frame-length-modulated to [560 μs, 600 μs, 560 μs, 600 μs, 560 μs, 600 μs, 560 μs, 600 μs, 560 μs, 600 μs, 560 μs, 600 μs, 560 μs, 600 μs, 560 μs, 600 μs]; the transmission information "1" is frame-length-modulated to [560 μs, 600 μs, 560 μs, 600 μs, 560 μs, 600 μs, 560 μs, 600 μs, 560 μs, 600 μs, 560 μs, 600 μs, 560 μs, 600 μs, 560 μs]; and so forth, and; the transmission information "254" is frame-length-modulated to [600 μs, 560 μs, 600 μs, 560 μs, 600 μs, 560 μs, 600 μs, 560 μs, 600 μs, 560 μs, 600 μs, 560 μs, 600 μs, 560 μs, 600 μs, 560 μs]; and the transmission information "255" is frame-length-modulated to [600 μs, 560 μs, 600 μs, 560 μs, 600 μs, 560 μs, 600 μs, 560 μs, 600 μs, 560 μs, 600 μs, 560 μs, 600 μs, 560 μs, 600 μs, 560 μs].

The encoding circuit 11 of the transmitter 1 incorporates the table TBL6, and refers to the table TBL6 and assigns two frame lengths to each of the first, second, third, fourth, fifth, sixth, seventh and eighth codes that constitute the transmission information "0" to "255" to frame-length-modulate the transmission information "0" to "255".

Thus, if transmission information k is converted to the binary system, each of the transmission information "0" to "255" is represented by 16 (=2x) frame lengths.

As described above, if m transmission information k are converted to the base n, the transmission information k is represented by a code sequence composed of $x = \text{Ceil}(\log_n m)$ codes, and two different frame lengths are assigned to each of the x codes to frame-length-modulate the transmission information k. As a result, the transmission information k is represented by 2x frame lengths.

Since in FIG. 4, x=2, n=2 and the number m of types of the transmission information k is 4, $2^1 < 4 \le 2^2$ is true. Since in FIG. 5, x=1, n=4, and the number m of types of the transmission information k is 4, $4^0 < 4 \le 4^1$ is true. Since in FIG. 6, x=1, n=8 and the number m of types of the transmission information k is 4, $8^0 < 4 \le 8^1$ is true. Since in FIG. 7, x=2, n=16 and the number m of types of the transmission information k is 256, $16^1 < 256 \le 16^2$ is true. Since in FIG. 8, x=4, n=4 and the number m of types of the transmission information k is 256, $4^3 < 256 \le 4^4$ is true. Since in FIG. 9, x=8, n=2 and the number m of types of the transmission information k is 256, $2^7 < 256 < 2^8$ is true.

Therefore, generally, the number m of types of the transmission information k, n and x satisfy the relationship of $n^{x-1} < m \le n^x$.

In the tables TBL1 to TBL6 shown in FIGS. 4 to 9, respectively, the interval between the plurality of frame lengths arranged in ascending or descending order in the first and second frames may be determined based on the performance of the receiver 2. More specifically, the interval between the plurality of frame lengths is relatively small if the detection performance of frame length in the receiver 2 is relatively high, and is relatively large if the detection performance of frame length in the receiver 2 is relatively small.

While FIGS. 4 to 9 illustrate implementations where the transmission information k is converted to the binary, quaternary, octonary or hexadecimal code sequence and the converted code sequence is frame-length-modulated, embodiments of the present information are not limited to such implementations and the transmission information k may be converted to a ternary, quinary or septenary code sequence and the converted code sequence may be frame-length-modulated; generally, the transmission information k may be converted to a code sequence in the base n and the converted code sequence may be frame-length-modulated.

FIG. 10 illustrates generally a method of frame length modulation according to an embodiment of the present invention.

If the transmission information k is converted to a code sequence in the base n and the converted code sequence is frame-length-modulated, $x = \text{Ceil}(\log_n m)$ is calculated to determine the number of codes resulting from conversion of the transmission information k to a code sequence in the base n. Then, the relationship between the transmission information "0", "1", "2", . . . , "n−2" and "n−1" to code sequences (i.e. first to xth codes) is established (see FIG. 10(a)). In this case, each of $a_{0,0}$-$a_{0,x-1}$, $a_{1,0}$-$a_{1,x-1}$, . . . $a_{n-2,0}$-$a_{n-2,x-1}$, $a_{n-1,0}$-$a_{n-1,x-1}$ is constituted by one of the codes in the base n, i.e. "0", "1", "2", . . . , "n−2" and "n−1".

The frame lengths of the first and second frames assigned to each of a plurality of codes in the base n, i.e. "0", "1", "2", . . . , "n−2" and "n−1" are determined in such a way that, for two arbitrary codes out of the plurality of codes, i.e. "0", "1", "2", . . . , "n−2" and "n−1", in the base n, the frame length of the first frame assigned to one code is smaller (or greater) than the frame length of the first frame assigned to the other code, and the frame length of the second frame assigned to one code is greater (or smaller) than the frame length of the second frame assigned to the other code. Then, a table TBL is created, including the plurality of codes in the base n and two frames assigned to each of the plurality of codes (first and second frames) (see FIG. 10(b)). For the frame lengths $l_1$ to $l_n$, the relationship of $l_1 < l_2 < \ldots < l_{n-1} < l_n$ is satisfied Then, the table TBL is referred to and two different frame lengths are assigned to each of the code sequences in the base n (=$a_{0,0}$-$a_{0,x-1}$ and so on) that represent the transmission information "0", "1", "2", ..., "n-2" and "n-1" for frame-length modulation.

While in the table TBL, the same frame lengths $l_1$-$l_n$ are assigned to the first and second frames, embodiments of the present invention are not limited to such implementations, and frame lengths arranged in ascending order ($l_1 < l_2 < \ldots < l_{n-1} < l_n$) may be assigned to first frames and frame lengths $j_i$ arranged in descending order ($j_1 < j_2 < \ldots < j_{n-1} < j_n$) may be assigned to second frames, or frame lengths arranged in descending order ($l_1 < l_2 < \ldots l_{n-1} < l_n$) may be assigned to first frames and frame lengths $j_i$ arranged in ascending order ($j_1 < j_2 < \ldots < j_{n-1} < j_n$) may be assigned to second frames.

If the transmission information is represented by two or more codes, the invention is not limited to implementations where two frame lengths are assigned to each code, and three or more frame lengths may be assigned to each code. As a result, each of the transmission information is represented by 2x or more frame lengths (=a plurality of frame lengths).

Therefore, in an embodiment of the present invention, each of the transmission information is represented by two or more frame lengths (=a plurality of frame lengths), including implementations where each of the transmission information is represented by one code.

Figure 11:
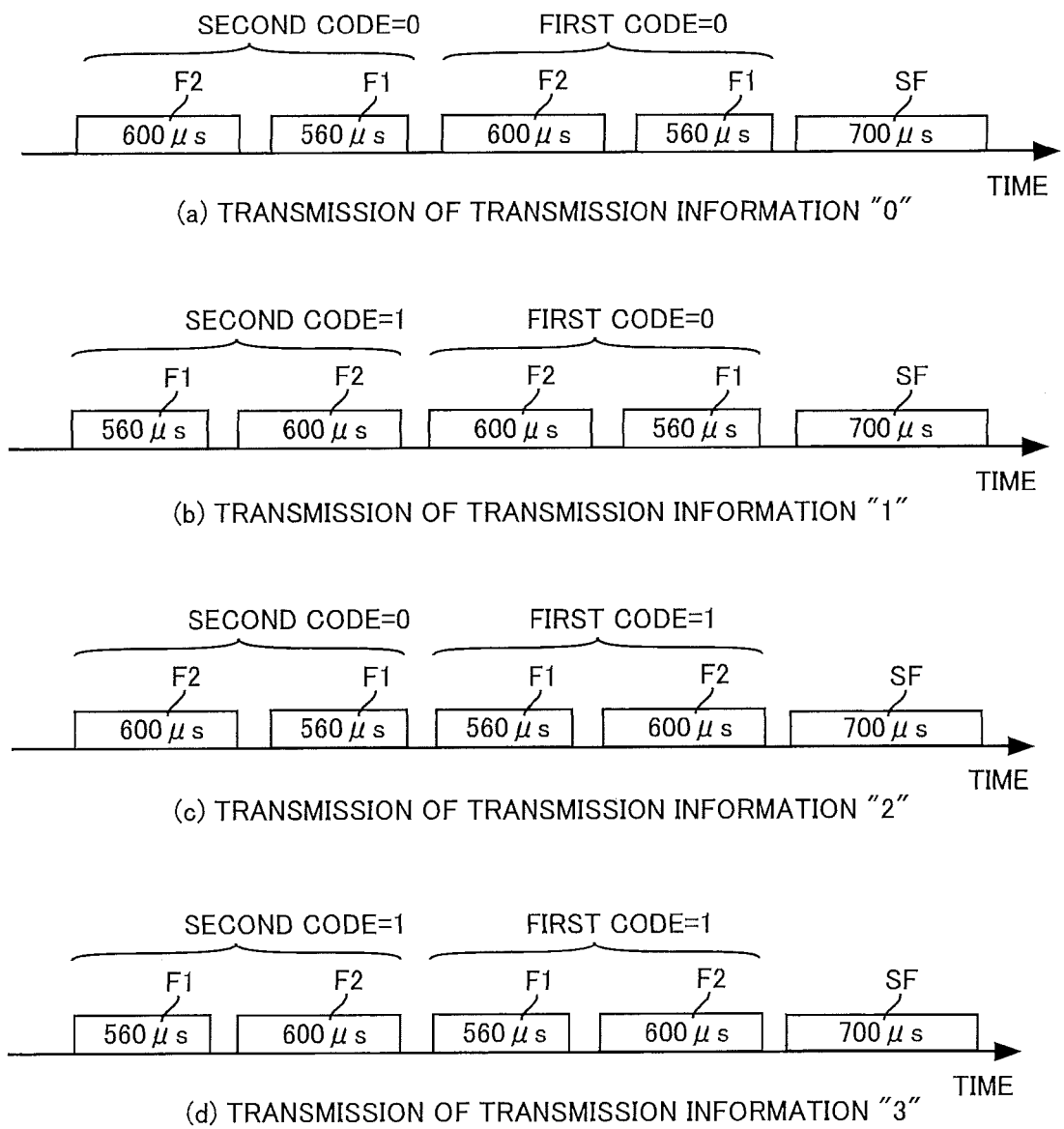
FIG. 11 illustrates a method of transmitting, via wireless communication, transmission information k that has been frame-length-modulated.

FIG. 11 illustrates a method of transmitting, via wireless communication, the transmission information k that has been frame-length-modulated.

FIG. 11 illustrates a method of transmitting, when the four transmission information "0", "1", "2" and "3" are converted to the binary system (see FIG. 4), the transmission information k (="0", "1", "2" or "3") via wireless communication.

When the transmission information "0" is transmitted, the frame length modulation transmitter 12 of the transmitter 1 sequentially receives the four frame lengths of 560 µs, 600 µs, 560 µs and 600 µs from the encoding circuit 11.

Then, the frame length modulation transmitter 12 generates a start frame SF having a frame length of 700 µs and transmits the generated start frame SF via the antenna 13. Thereafter, the frame length modulation transmitter 12 generates a radio frame F1 having a frame length of 560 µs, in accordance with the frame length 560 µs that was received first, and transmits the generated radio frame F1 via the antenna 13. Subsequently, the frame length modulation transmitter 12 generates a radio frame F2 having a frame length of 600 µs, in accordance with the frame length 600 µs that was received second, and transmits the generated radio frame F2 via the antenna 13. Further, the frame length modulation transmitter 12 generates a radio frame F1 having a frame length of 560 µs, in accordance with the frame length 560 µs that was received third, and transmits the generated radio frame F1 via the antenna 13. Further, the frame length modulation transmitter 12 generates a radio frame F2 having a frame length of 600 µs, in accordance with the frame length 600 µs that was received last, and transmits the generated radio frame F2 via the antenna 13. Thus, the transmission information "0" is transmitted by the four radio frames F1, F2, F1 and F2 (see FIG. 11 (a)).

Further, when the transmission information "1" is transmitted, the frame length modulation transmitter 12 of the transmitter 1 sequentially receives the four frame lengths of 560 µs, 600 µs, 600 µs and 560 µs from the encoding circuit 11.

Then, the frame length modulation transmitter 12 generates the start frame SF and transmits the generated start frame SF via the antenna 13. Thereafter, the frame length modulation transmitter 12 generates a radio frame F1 having a length of 560 µs, in accordance with the frame length 560 µs that was received first, and transmits the generated radio frame F1 via the antenna 13. Subsequently, the frame length modulation transmitter 12 generates a radio frame F2 having a length of 600 µs, in accordance with the frame length 600 µs that was received second, and transmits the generated radio frame F2 via the antenna 13. Further, the frame length modulation transmitter 12 generates a radio frame F2 having a length of 600 µs, in accordance with the frame length 600 µs that was received third, and transmits the generated radio frame F2 via the antenna 13. Further, the frame length modulation transmitter 12 generates a radio frame F1 having a length of 560 µs, in accordance with the frame length 560 us that was received last, and transmits the generated radio frame F1 via the antenna 13. Thus, the transmission information "1" is transmitted by the four radio frames F1, F2, F2 and F1 (see FIG. 11 (b)).

Furthermore, when the transmission information "2" is transmitted, the frame length modulation transmitter 12 of the transmitter 1 sequentially receives the four frame lengths of 600 µs, 560 µs, 560 µs and 600 µs from the encoding circuit 11.

Then, the frame length modulation transmitter 12 generates the start frame SF and transmits the generated start frame SF via the antenna 13. Thereafter, the frame length modulation transmitter 12 generates a radio frame F2 having a frame length of 600 µs, in accordance with the frame length 600 µs that was received first, and transmits the generated radio frame F2 via the antenna 13. Subsequently, the frame length modulation transmitter 12 generates a radio frame F1 having a frame length of 560 µs, in accordance with the frame length 560 µs that was received second, and transmits the generated radio frame F1 via the antenna 13. Further, the frame length modulation transmitter 12 generates a radio frame F1 having a frame length of 560 µs, in accordance with the frame length 560 µs that was received third, and transmits the generated radio frame F1 via the antenna 13. Further, the frame length modulation transmitter 12 generates a radio frame F2 having a frame length of 600 µs, in accordance with the frame length 600 µs that was received last, and transmits the generated radio frame F2 via the antenna 13. Thus, the transmission information "2" is transmitted by the four radio frames F2, F1, F1 and F2 (see FIG. 11 (c)).

Furthermore, when the transmission information "3" is transmitted, the frame length modulation transmitter 12 of the transmitter 1 sequentially receives the four frame lengths of 600 µs, 560 µs, 600 µs and 560 µs from the encoding circuit 11.

Then, the frame length modulation transmitter 12 generates the start frame SF and transmits the generated start frame SF via the antenna 13. Thereafter, the frame length modulation transmitter 12 generates a radio frame F2 having a frame length of 600 µs, in accordance with the frame length 600 µs that was received first, and transmits the generated radio frame F2 via the antenna 13. Subsequently, the frame length modulation transmitter 12 generates a radio frame F1 having a frame length of 560 µs, in accordance with the frame length 560 µs that was received second, and transmits the generated radio frame F1 via the antenna 13. Further, the frame length modulation transmitter 12 generates a radio frame F2 having a frame length of 600 µs, in accordance with the frame length 600 µs that was received third, and transmits the generated radio frame F2 via the antenna 13. Further, the frame length modulation transmitter 12 generates a radio frame F1 having a frame length of 560 µs, in accordance with the frame length 560 µs that was received last, and transmits the generated radio frame F1 via the antenna 13. Thus, the transmission information "3" is transmitted by the four radio frames F2, F1, F2 and F1 (see FIG. 11 (d)).

Accordingly, when the transmission information "0" is transmitted, the encoding circuit 11 of the transmitter 1 frame-length-modulates the code sequence [0,0] constituting the transmission information "0" in such a way that, in relation to the transmission information "1", a frame length of 600 μs included in the four frame lengths constituting the transmission information "0" (600 μs constituting the second code "0") is greater than a frame length of 560 μs included in the four frame lengths constituting the transmission information "1" (560 μs constituting the second code "0"), and a frame length of 560 μs included in the four frame lengths constituting the transmission information "0" (560 μs constituting the second code "0") is smaller than a frame length of 600 μs included in the four frame lengths constituting the transmission information "1" (600 μs constituting the second code "0").

Further, when the transmission information "0" is transmitted, the encoding circuit 11 of the transmitter 1 frame-length-modulates the code sequence [0,0] constituting the transmission information "0" in such a way that, in relation to the transmission information "2", a frame length of 600 μs included in the four frame lengths constituting the transmission information "0" (600 μs constituting the first code "0") is greater than a frame length of 560 μs included in the four frame lengths constituting the transmission information "2" (560 μs constituting the first code "1"), and a frame length of 560 μs included in the four frame lengths constituting the transmission information "0" (560 μs constituting the first code "0") is smaller than a frame length of 600 μs included in the four frame lengths constituting the transmission information "2" (600 μs constituting the first code "1").

Furthermore, when the transmission information "0" is transmitted, the encoding circuit 11 of the transmitter 1 frame-length-modulates the code sequence [0,0] constituting the transmission information "0" in such a way that, in relation to the transmission information "3", a frame length of 600 μs included in the four frame lengths constituting the transmission information "0" (600 μs constituting the first and second codes "0") is greater than a frame length of 560 μs included in the four frame lengths constituting the transmission information "3" (560 μs constituting the first and second codes "1"), and a frame length of 560 μs included in the four frame lengths constituting the transmission information "0" (560 μs constituting the first and second codes "0") is smaller than a frame length of 600 μs included in the four frame lengths constituting the transmission information "3" (600 μs constituting the first and second codes "1").

When any one of the transmission information "1", "2" and "3" is transmitted, the encoding circuit 11 of the transmitter 1 frame-length-modulates the code sequences [0,1], [1,0] or [1,1] constituting the transmission information "1", "2" or "3" such that the frame lengths have the above-described relationship with the other transmission information.

Generally, thus, the encoding circuit 11 of the transmitter 1 generates an even number of frame lengths such that a first frame length included in a first even number of frame lengths representing a first code sequence obtained by converting first transmission information to the base n is longer than a second frame length included in a second even number of frame lengths representing a second code sequence obtained by converting second transmission information to the base n, the second transmission information being different from the first transmission information, and a third frame length included in the first even number of frame lengths is smaller than a fourth frame length included in the second even number of frame lengths. The place in order of the first frame length within the first even number of frame lengths is equal to the place in order of the second frame length within the second even number of frame lengths, and the place in order of the third frame length within the first even number of frame lengths is equal to the place in order of the fourth frame length within the second even number of frame lengths.

Supposing that the transmission information "0" is transmitted, the likelihood of the transmission information "0" becoming erroneous to be taken for the transmission information "1" will be considered. The transmission information "0" and the transmission information "1" are such that the first code is "0" in both cases, the second code of the transmission information "0" is "0" and the second code of the transmission information "1" is "1".

Consequently, when the transmission information "0" becomes erroneous to be taken for the transmission information "1", it is necessary that the frame length of the radio frame F1 constituting the second code "0" of the transmission information "0", 560 μs, is erroneous to be taken for the frame length of the radio frame F2, 600 μs, and the frame length of the radio frame F2 constituting the second code "0" of the transmission information "0", 600 μs, is erroneous to be taken for the frame length of the radio frame F1, 560 μs.

However, as described above, in wireless communication, a frame length is rather likely to become erroneous to be taken for a smaller length, and therefore the frame length of the radio frame F1 constituting the second code "0" of the transmission information "0", 560 μs, is unlikely to become erroneous to be taken for the frame length of the radio frame F2, 600 μs. Consequently, the transmission information "0" is unlikely to become erroneous to be taken for the transmission information "1".

Next, supposing that the transmission information "0" is transmitted, the likelihood of the transmission information "0" becoming erroneous to be taken for the transmission information "2" will be considered. The first code of the transmission information "0" is "0", the first code of the transmission information "2" is "1", and the transmission information "0" and the transmission information "2" are such that the second code is "0" in both cases.

Consequently, when the transmission information "0" becomes erroneous to be taken for the transmission information "2", it is necessary that the frame length of the radio frame F1 constituting the first code "0" of the transmission information "0", 560 μs, is erroneous to be taken for the frame length of the radio frame F2, 600 μs, and the frame length of the radio frame F2 constituting the first code "0" of the transmission information "0", 600 μs, is erroneous to be taken for the frame length of the radio frame F1, 560 μs.

However, as described above, in wireless communication, a frame length is rather likely to become erroneous to be taken for a smaller length, and therefore the frame length of the radio frame F1 constituting the first code "0" of the transmission information "0", 560 μs, is unlikely to become erroneous to be taken for the frame length of the radio frame F2, 600 μs. Consequently, the transmission information "0" is unlikely to become erroneous to be taken for the transmission information "2".

Subsequently, supposing that the transmission information "0" is transmitted, the likelihood of the transmission information "0" becoming error to be taken for the transmission information "3" will be considered. The first code of the transmission information "0" is "0", the first code of the transmission information "3" is "1", the second code of the transmission information "0" is "0", and the second code of the transmission information "3" is "1".

Consequently, when the transmission information "0" becomes erroneous to be taken for the transmission information "3", it is necessary that the frame length of the radio frame F1 constituting the first code "0" of the transmission information "0", 560 µs, is erroneous to be taken for the frame length of the radio frame F2, 600 µs, the frame length of the radio frame F2 constituting the first code "0" of the transmission information "0", 600 µs, is erroneous to be taken for the frame length of the radio frame F1, 560 µs, the frame length of the radio frame F1 constituting the second code "0" of the transmission information "0", 560 µs, is erroneous to be taken for the frame length of the radio frame F2, 600 µs, and the frame length of the radio frame F2 constituting the second code "0" of the transmission information "0", 600 µs, is erroneous to be taken for the frame length of the radio frame F1, 560 µs.

However, as described above, in wireless communication, a frame length is rather likely to become erroneous to be taken for a smaller length, and therefore it is very unlikely that the frame length of a radio frame F1 constituting the first code "0" of the transmission information "0", 560 µs, becomes erroneous to be taken for the frame length of the radio frame F2, 600 µs, and the frame length of a radio frame F1 constituting the second code "0" of the transmission information "0", 560 µs, becomes erroneous to be taken for the frame length of the radio frame F2, 600 µs. Consequently, the transmission information "0" is very unlikely to become erroneous to be taken for the transmission information "3".

Similar considerations apply to the likelihood of the transmission information "1" becoming erroneous to be taken for any one of the transmission information "0", "2" and "3", the likelihood of the transmission information "2" becoming erroneous to be taken for any one of the transmission information "0", "1" and "3", and the likelihood of the transmission information "3" becoming erroneous to be taken for any one of the transmission information "0", "1" any "2".

Accordingly, transmission errors can be reduced by frame-length-modulating the transmission information "0", "2" and "3" using the above-described manner and transmitting them via wireless communication.

Also, when the transmission information k is frame-length-modulated using the method shown in one of FIGS. 5 to 9 and the frame-length-modulated transmission information k is transmitted via wireless communication, the transmission information k may be transmitted via wireless communication using the same method as that described in FIG. 11.

Thus, transmission errors of transmission information k can be reduced as described above when the transmission information k is frame-length-modulated using the method shown in one of FIGS. 5 to 9 and the frame-length-modulated transmission information k is transmitted via wireless communication.

As described above, each of the codes constituting the transmission information k is represented by two frame lengths. Therefore, the code sequence constituting the transmission information k is represented by an even number of frame lengths, and is transmitted in the even number of radio frames.

In connection with the above, after four radio frames are transmitted, an end frame indicating an end of transmission of radio frames may be provided. In this case, an end frame has a length that is different from the frame length of a start frame and the frame length assigned to each code. This enables accurate detection of an end of transmission of radio frames, enabling accurate detection of the frame lengths of a plurality of radio frames.

Figure 12:
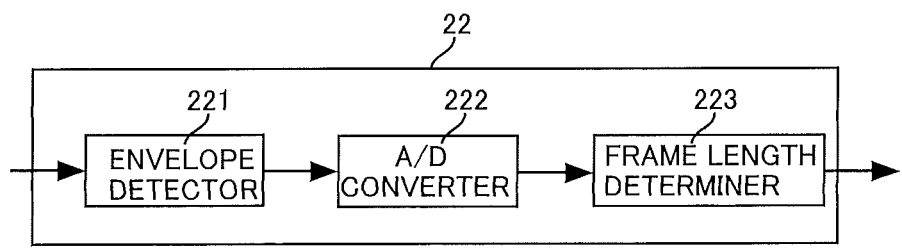
FIG. 12 is a schematic diagram of a configuration of the frame length receiver shown in FIG. 3.
Figure 13:
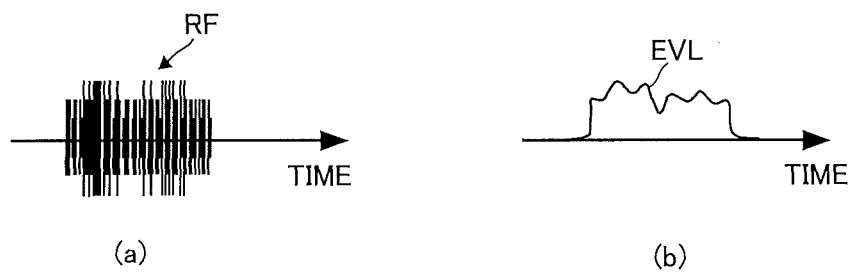
FIG. 13 shows conceptual diagrams of a reception signal and envelope of a radio signal.
Figure 14:
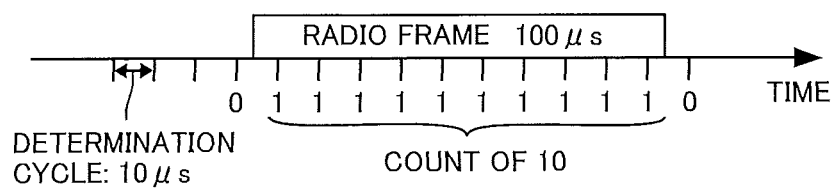
FIG. 14 illustrates a method of detecting a frame length.

FIG. 12 is a schematic diagram of a configuration of the frame length receiver 22 shown in FIG. 3. FIG. 13 shows conceptual diagrams of a reception signal and envelope of a radio signal. FIG. 14 illustrates a method of detecting a frame length.

Referring to FIG. 12, the frame length receiver 22 includes an envelope detector 221, an A/D converter 222 and a frame length determiner 223.

The envelope detector 221 receives a radio signal via the antenna 21, and detects an envelope of the received reception signal RF (see FIG. 13(a)) to detect the envelope EVL (see FIG. 13(b)). Then, the envelope detector 221 outputs the detected envelope EVL to the A/D converter 222.

The A/D converter 222 receives the envelope EVL from the envelope detector 221, compares the received envelope EVL with a threshold and converts the envelope EVL, which is an analog signal, to a digital signal. In this case, the threshold may be 82 [dBm], for example. Then, the A/D converter 222 outputs the digital signal to the frame length determiner 223.

The frame length determiner 223 receives the digital signal from the A/D converter 222, determines whether the received digital signal is "0" or "1" at a determination cycle, and counts the number of "1". The determination cycle may be 10 µs, for example.

Then, the frame length determiner 223 multiplies the counted number of "1" (=10) by the determination cycle (=10 µs) to detect the frame length of a radio frame (100 µs) (see FIG. 14). Then, the frame length determiner 223 outputs the detected frame length to the decoding circuit 23.

A method of decoding in the decoding circuit 23 will be described. In implementations where the transmission information k is frame-length-modulated in the manner shown in FIG. 4 and then transmitted, the decoding circuit 23 incorporates the table TBL1.

If the transmission information "0" is transmitted by the radio frames F1, F2, F1 and F2 shown in FIG. 11(a), the decoding circuit 23 sequentially receives the frame lengths of 700 µs, 560 µs, 600 µs, 560 µs and 600 µs from the frame length determiner 223.

Then, the decoding circuit 23 refers to the table TBL1 to detect that the frame length of 700 µs is not incorporated in the table TBL1, thereby detecting that transmission of the transmission information "0" has started.

Thereafter, at the time when the decoding circuit 23 has received the frame length of 560 µs and the frame length of 600 µs, it refers to the table TBL1 and decodes the two frame lengths 560 µs and 600 µs to the code "0".

Subsequently, at the time when the decoding circuit 23 has received the frame length of 560 µs and the frame length of 600 µs, it refers to the table TBL1 and decodes the two frame lengths 560 µs and 600 µs to the code "0".

Accordingly, the decoding circuit 23 outputs the code sequence [0,0] to the host system 4.

Thus, when the decoding circuit 23 detects that transmission of the transmission information "0" has started, it refers to the table TBL1 and, every two frame lengths which are continuously input, decodes the two frame lengths to codes and outputs the code sequence [0,0] constituting the transmission information "0" to the host system 4.

Similarly, when the transmission information "1", "2" or "3" shown in FIG. 11 is transmitted, the decoding circuit 23 decodes a plurality of frame lengths to codes in an analogous manner, and outputs the code sequence [0,1], [1,0] or [1,1] constituting the transmission information "1", "2" or "3" to the host system 4.

In implementations where transmission information k is frame-length-modulated using the method shown in one of FIGS. 5 to 9 and then transmitted, the decoding circuit 23 incorporates the tables TBL2 to TBL6, respectively, and decodes frame lengths to codes in the same manner as discussed above and outputs the code sequence constituting the transmission information k to the host system 4.

Figure 15:
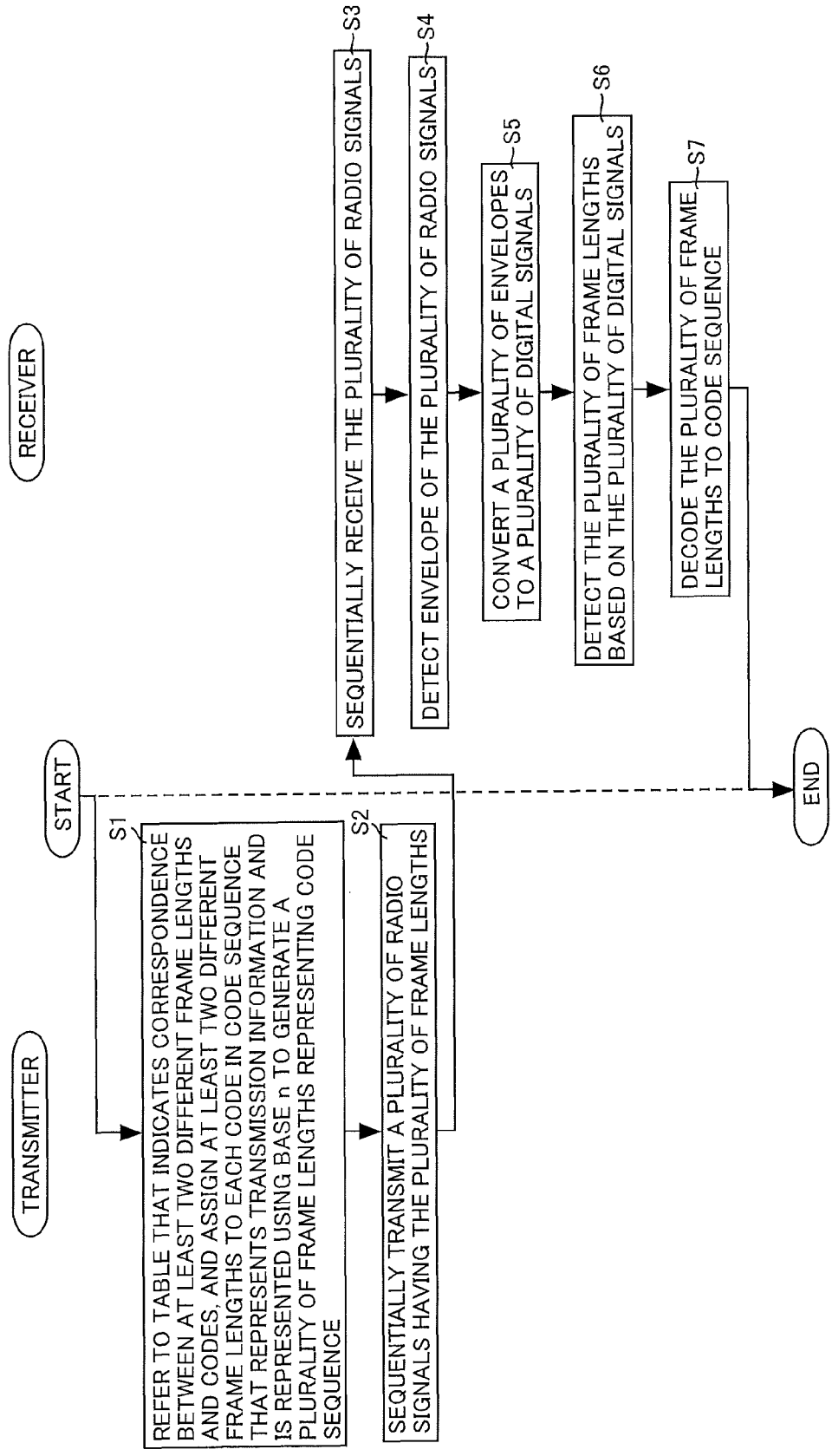
FIG. 15 is a flow chart illustrating a wireless communication method according to an embodiment of the present invention.

FIG. 15 is a flow chart illustrating a wireless communication method according to an embodiment of the present invention. Referring to FIG. 15, when transmission of the transmission information has started, the encoding circuit 11 of the transmitter 1 refers to a table (=one of the tables TBL1 to TBL6) that indicates the correspondence between at least two different frame lengths and codes, assigns at least two different frame lengths to each code in a code sequence that represents transmission information and is represented using the base n to generate a plurality of frame lengths representing the code sequence (step S1).

Then, the frame length modulation transmitter 12 of the transmitter 1 sequentially receives the plurality of frame lengths from the encoding circuit 11, sequentially generates a plurality of radio signals (=a plurality of radio frames) having the received plurality of frame lengths and sequentially transmits the generated plurality of radio signals (=the plurality of radio frames) via the antenna 13 (step S2).

Thereafter, the frame length receiver 22 of the receiver 2 sequentially receives the plurality of radio signals via the antenna 21 (step S3), and detects envelopes of the received plurality of radio signals (step S4).

Then, the frame length receiver 22 uses a threshold to convert the plurality of envelopes to a plurality of digital signals (step S5) and, based on the converted plurality of digital signals, detects the plurality of frame lengths using the method described above (step S6).

Accordingly, the decoding circuit 23 refers to the table (=one of the tables TBL1 to TBL6) and decodes the plurality of frame lengths to a code sequence (step S7).

Thus, wireless communication is completed.

In this way, the receiver 2 detects envelopes of a plurality of radio signals and converts the detected envelopes to digital signals to detect frame lengths (see steps S4 to S6). Consequently, the receiver 2 detects frame lengths in an asynchronous manner with respect to the transmitter 1. Therefore, power consumption in the receiver 2 can be reduced.

Figure 16:
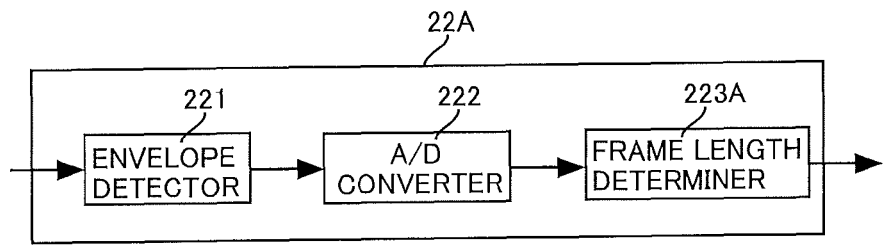
FIG. 16 is a schematic diagram of another configuration of the frame length receiver shown in FIG. 3.
Figure 17:
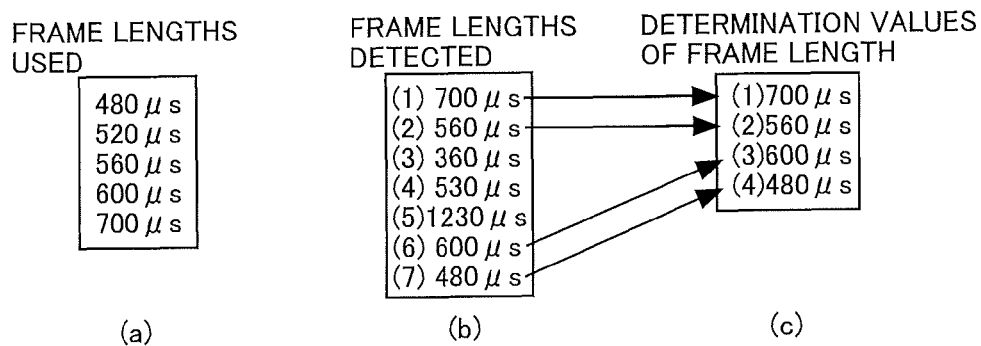
FIG. 17 illustrates a method of determining frame lengths.

FIG. 16 is a schematic diagram of another configuration of the frame length receiver shown in FIG. 3. FIG. 17 illustrates a method of determining a frame length. The numbers in FIG. 17 (b) and (c) each indicate the place in order of a detected frame length.

In an embodiment of the present invention, the receiver 2 may include a frame length receiver 22A in place of the frame length receiver 22.

Referring to FIG. 16, the frame length receiver 22A is the same as the frame length receiver 22 except that the frame length determiner 223 of the frame length receiver 22 is replaced by a frame length determiner 223A.

The frame length determiner 223A receives a digital signal from the A/D converter 222 and, based on the received digital signal, detects the frame length in the same manner as that in the frame length determiner 223.

Then, the frame length determiner 223A discards frame lengths that are not being used in wireless communication among the detected frame lengths, and outputs only frame lengths that are being used in wireless communication to the decoding circuit 23.

A more specific description will be given. Referring to FIG. 17, it is supposed that the frame lengths of 480 µs, 520 µs, 560 µs, 600 µs and 700 µs are being used in wireless communication (see (a)).

The frame length determiner 223A sequentially detects the frame lengths of 700 µs, 560 µs, 360 µs, 530 µs, 1230 µs, 600 µs and 480 µs (see (b)).

Then, out of the frame lengths of 700 µs, 560 µs, 360 µs, 530 µs, 1230 µs, 600 µs and 480 µs, the frame length determiner 223A discards the frame lengths of 360 µs, 530 µs and 1230 µs, which are not being used in wireless communication, and holds the frame lengths of 700 µs, 560 µs, 600 µs and 480 µs as determination values of frame length (see (c)).

By excluding the frame lengths that are not being used in wireless communication, frame lengths that are being used in wireless communication can be accurately detected, further reducing errors in transmission information k.

Figure 18:
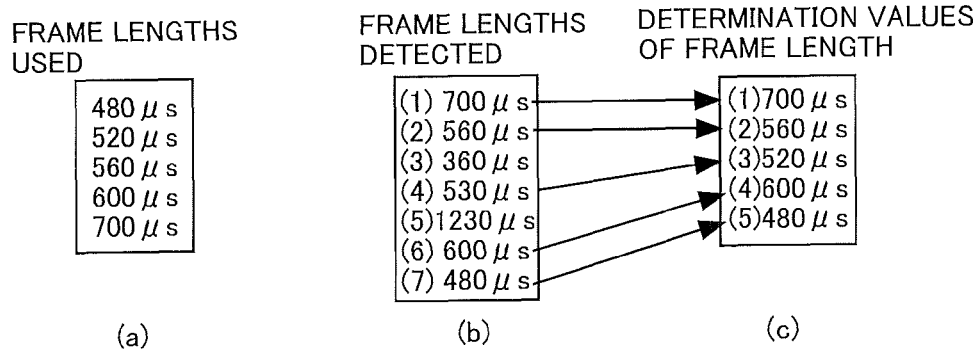
FIG. 18 illustrates another method of determining frame lengths.

FIG. 18 illustrates another method of determining frame lengths. The numbers in FIG. 18 (b) and (c) each indicate the place in order of a detected frame length.

Referring to FIG. 18, the frame lengths used in wireless communication and the frame lengths detected are the same as those shown in FIG. 17 (see (a) and (b)).

After the frame length determiner 223A has detected the frame lengths, it excludes the frame lengths that are not being used in wireless communication among the detected frame lengths, where a tolerance a in fluctuations of frame length is taken into consideration. The tolerance a may be any one of +10 µs, 10 µs and ±10 µs, for example.

A more specific description will be given. When the frame length determiner 223A has sequentially detected the frame lengths of 700 µs, 560 µs, 360 µs, 530 µs, 1230 µs, 600 µs and 480 µs (see (b)), it determines frame lengths taking the tolerance a (=+10 µs) into consideration.

As a result, the frame length determiner 223A determines the frame length of 530 µs as the frame length of 520 µs. The frame lengths of 360 µs and 1230 µs do not result from adding the tolerance a (=+10 µs) to any one of the frame lengths being used in wireless communication, i.e. 480 µs, 520 µs, 560 µs, 600 µs and 700 µs. Accordingly, the frame length determiner 223A discards the frame lengths of 360 µs and 1230 µs.

Then, the frame length determiner 223A holds the frame lengths of 700 µs, 560 µs, 520 µs, 600 µs and 480 µs as determination values of frame length (see (c)).

If the decoding circuit 23 detects a combination of frame lengths (two frame lengths) that is not present in the table (=one of the tables TBL1 to TBL6), it determines that the combination is an error.

Figure 19:
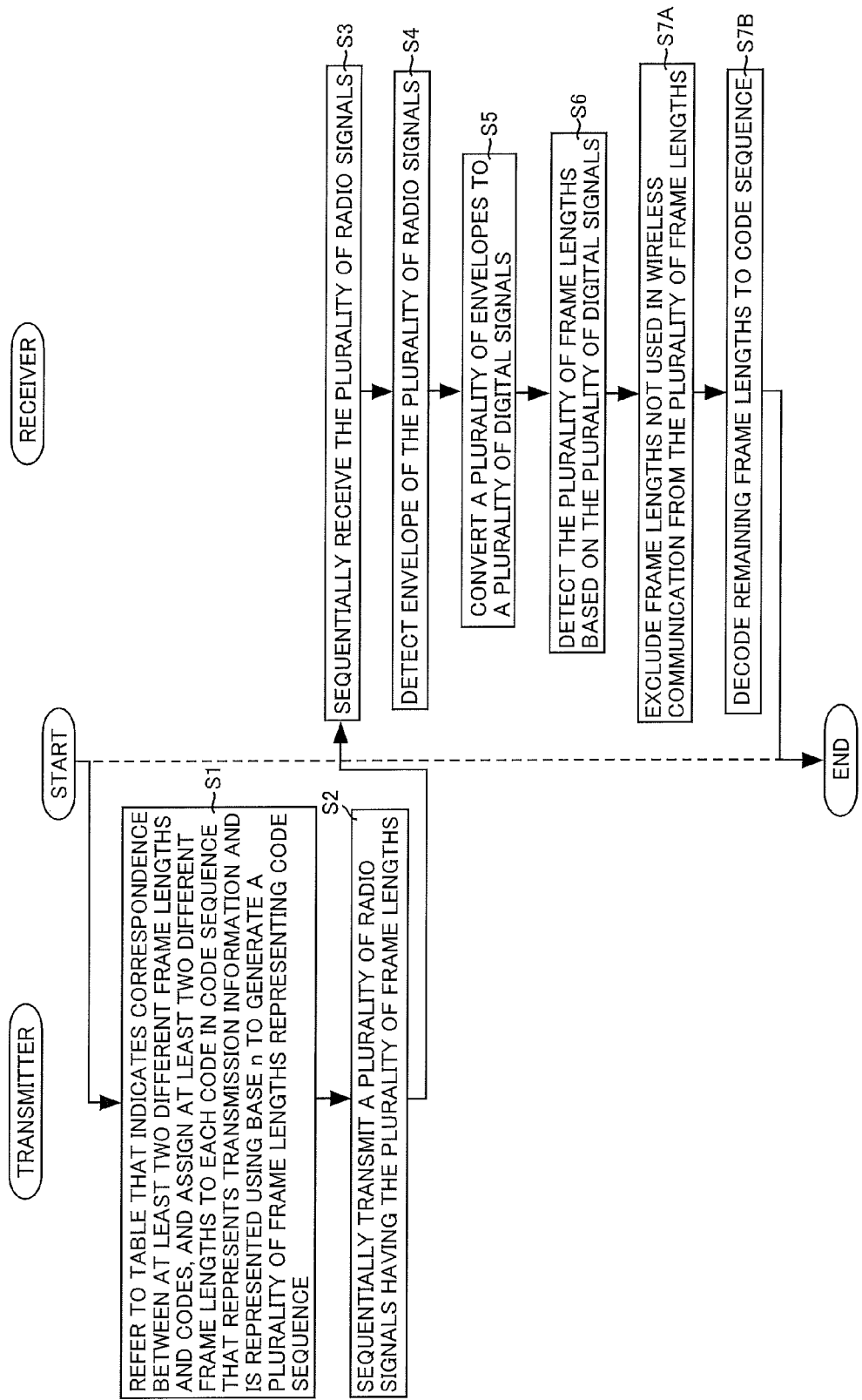
FIG. 19 is a flow chart illustrating a wireless communication method in the case that the receiver includes the frame length receiver shown in FIG. 16.

FIG. 19 is a flow chart illustrating a wireless communication method in the case that the receiver 2 includes the frame length receiver 22A shown in FIG. 16.

The flow chart shown in FIG. 19 is the same as that shown in FIG. 15 except that the step S7 of the flow chart shown in FIG. 15 is replaced by steps S7A and S7B.

Referring to FIG. 19, when transmission of transmission information k has started, the steps S1 to S6 described above are sequentially performed.

After the step S6, the frame length determiner 223A excludes, from the plurality of frame lengths, frame lengths that are not being used in wireless communication (step S7A).

Then, the decoding circuit 23 refers to the table (=one of the tables TBL1 to TBL6) and decodes the remaining frame lengths to a code sequence (step S7B).

Thus, wireless communication is completed.

Figure 20:
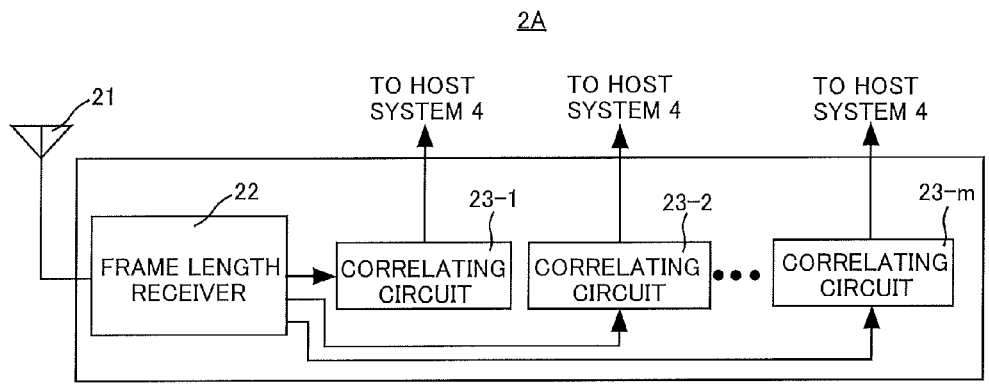
FIG. 20 is a schematic diagram of another configuration of the receiver shown in FIG. 1.

In this way, in implementations where the receiver 2 includes a frame length determiner 223A, it detects frame lengths in a manner similar to that of implementations where it includes the frame length determiner 223. Power consumption in the receiver 2 can be reduced FIG. 20 is a schematic diagram of another configuration of the receiver shown in FIG. 1. The wireless communication system 10 may include a receiver 2A shown in FIG. 20 in place of the receiver 2.

Referring to FIG. 20, the receiver 2A is the same as the receiver 2 except that the decoding circuit 23 of the receiver 2 shown in FIG. 3 is replaced by correlating circuits 23-1 to 23-$m$.

The correlating circuits 23-1 to 23-$m$ are provided to correspond to m transmission information. Each of the correlating circuits 23-1 to 23-$m$ receives, out of the m transmission information, a plurality of frame lengths that constitute corresponding transmission information k from the frame length receiver 22, and determines whether the pattern of the received plurality of frame lengths matches the pattern of a plurality of frame lengths constituting transmission information k. Then, each of the correlating circuits 23-1 to 23-$m$ outputs its determination results to the host system 4.

In implementation using the receiver 2A, the start frame SF and the end frame as shown in FIG. 11 are not used.

Figure 21:
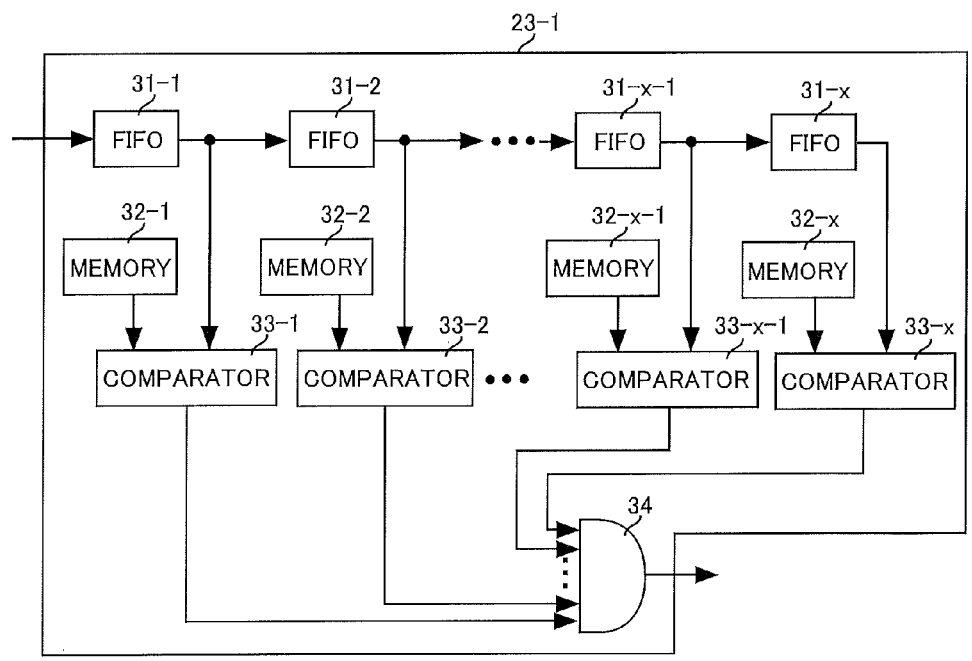
FIG. 21 is a schematic diagram of a configuration of the correlating circuit shown in FIG. 20.

FIG. 21 is a schematic diagram of a configuration of the correlating circuit 23-1 shown in FIG. 20. Referring to FIG. 21, the correlating circuit 23-1 includes FIFOs (First In First Out) 31-1 to 31-$x$, memories 32-1 to 32-$x$, comparators 33-1 to 33-$x$ and an AND circuit 34.

The FIFOs 31-1 to 31-$x$ is provided to correspond to the number of the frame lengths constituting the transmission information k, and are connected in series.

The memories 32-1 to 32-$x$ are provided to correspond to the FIFO 31-1 to 31-$x$, respectively.

The FIFO 31-1 receives a frame length from the frame length receiver 22 and holds the received frame length. Then, every time the FIFO 31-1 receives a frame length from the frame length receiver 22, it outputs the frame length that it holds to the FIFO 31-2 and the comparator 33-1.

The FIFO 31-2 receives a frame length from the FIFO 31-1 and holds the received frame length. Then, every time the FIFO 31-2 receives a frame length from the frame length receiver 22, it outputs the frame length that it holds to the FIFO 31-3 and the comparator 33-2.

Similarly, the FIFO 31-$x$-1 receives a frame length from the FIFO 31-$x$-2 and holds the received frame length. Then, every time the FIFO 31-$x$-1 receives a frame length from the frame length receiver 22, it outputs the frame length that it holds to the FIFO 31$x$ and the comparator 33-$x$-1. The FIFO 31$x$ receives a frame length from the FIFO 31-$x$-1 and holds the received frame length. Then, every time the FIFO 31$x$ receives a frame length from the frame length receiver 22, it outputs the frame length that it holds to the comparator 33$x$.

The memory 32-1 stores the frame length representing the code at the highest place of the code sequence representing the transmission information k, and outputs the stored frame length to the comparator 33-1.

The memory 32-2 stores the frame length representing the code at the second highest place of the code sequence representing the transmission information k, and outputs the stored frame length to the comparator 33-2.

Similarly, the memory 32-$x$-1 stores the frame length representing the code at the second lowest place, and outputs the stored frame length to the comparator 33-$x$-1. The memory 32-$x$ stores the frame length representing the code at the lowest place, and outputs the stored frame length to the comparator 33-$x$.

The comparator 33-1 receives frame lengths from the FIFO 31-1 and memory 32-1. Then, if the frame length received from the FIFO 31-1 is equal to the frame length received from the memory 32-1, the comparator 33-1 outputs a signal of H (logical high) level to the AND circuit 34. If the frame length received from the FIFO 31-1 is not equal to the frame length received from the memory 32-1, the comparator 33-1 outputs a signal of L (logical low) level to the AND circuit 34.

The comparator 33-2 receives frame lengths from the FIFO 31-2 and memory 32-2. Then, if the frame length received from the FIFO 31-2 is equal to the frame length received from the memory 32-2, the comparator 33-2 outputs a signal of H level to the AND circuit 34. If the frame length received from the FIFO 31-2 is not equal to the frame length received from the memory 32-2, the comparator 33-2 outputs a signal of L level to the AND circuit 34.

Similarly, the comparator 33-$x$-1 receives frame lengths from the FIFO 31-$x$-1 and memory 32-$x$-1. Then, if the frame length received from the FIFO 31-$x$-1 is equal to the frame length received from the memory 32-$x$-1, the comparator 33-$x$-1 outputs a signal of H level to the AND circuit 34. If the frame length received from the FIFO 31-$x$-1 is not equal to the frame length received from the memory 32-$x$-1, the comparator 33-$x$-1 outputs a signal of L level to the AND circuit 34.

The comparator 33-$x$ receives frame lengths from the FIFO 31-$x$ and memory 32-$x$. Then, if the frame length received from the FIFO 31-$x$ is equal to the frame length received from the memory 32-$x$, the comparator 33-$x$ outputs a signal of H level to the AND circuit 34. If the frame length received from the FIFO 31-$x$ is not equal to the frame length received from the memory 32-$x$, the comparator 33-$x$ outputs a signal of L level to the AND circuit 34.

The AND circuit 34 receives signals of H or L level from the comparators 33-1 to 33-$x$, and calculates the logical product of the received signals. Then, the AND circuit 34 outputs the calculation result to the host system 4.

Each of the correlating circuits 23-2 to 23-$m$ shown in FIG. 20 has the same configuration as the correlating circuit 23-1 shown in FIG. 21.

The operation of the correlating circuits 23-1 to 23-$m$ in implementations where the transmission information k is frame-length-modulated using the method shown in FIG. 4 and then transmitted will be described.

If the transmission information k is frame-length-modulated using the method shown in FIG. 4 and then transmitted, the transmission information is composed of four of "0", "1", "2" and "3", and therefore, the receiver 2A includes the four correlating circuits 23-1 to 23-4. The correlating circuit 23-1 determines whether the pattern of an even number of frame lengths received from the frame length receiver 22 matches the pattern of the four frame lengths constituting the transmission information "0"; the correlating circuit 23-2 determines whether the pattern of an even number of frame lengths received from the frame length receiver 22 matches the pattern of the four frame lengths constituting the transmission information "1"; the correlating circuit 23-3 determines whether the pattern of an even number of frame lengths received from the frame length receiver 22 matches the pattern of the four frame lengths constituting the transmission information "2"; and the correlating circuit 23-4 determines whether the pattern of an even number of frame lengths received from the frame length receiver 22 matches the pattern of the four frame lengths constituting the transmission information "3".

Figure 22:
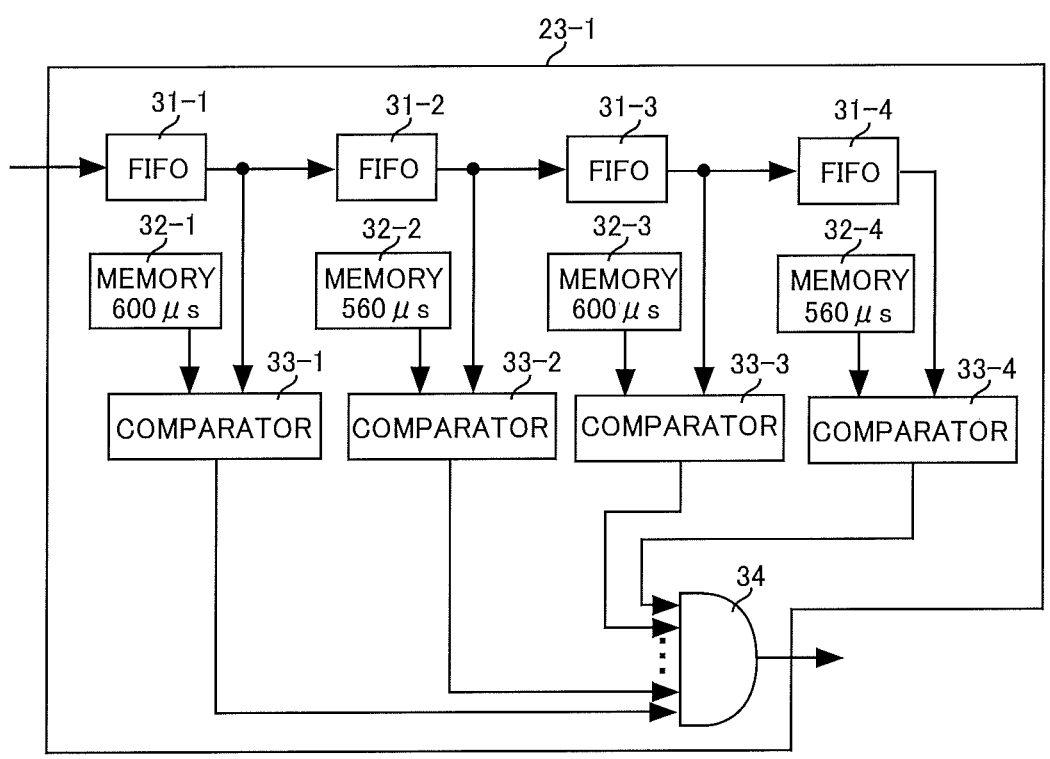
FIG. 22 illustrates the operation of a correlating circuit.

FIG. 22 illustrates the operation of the correlating circuit 23-1. In the case that frame length modulation is performed using the method shown in FIG. 4, the transmission information "0" is represented by four frame lengths, and thus the correlating circuit 23-1 includes four FIFOs 31-1 to 31-4, four memories 32-1 to 32-4 and four comparators 33-1 to 33-4.

The transmission information "0" is represented by the frame lengths of 560 μs, 600 μs, 560 μs and 600 μs. Accordingly, the memory 32-1 stores the frame length of 600 μs which is the last, i.e. fourth frame length, and outputs the stored frame length of 600 μs to the comparator 33-1. The memory 32-2 stores the frame length of 560 μs which is the third frame length, and outputs the stored frame length of 560 μs to the comparator 33-2. The memory 32-3 stores the frame length of 600 μs which is the second frame length, and outputs the stored frame length of 600 μs to the comparator 33-3. The memory 32-4 stores the frame length of 560 μs which is the first frame length, and outputs the stored frame length of 560 μs to the comparator 33-4.

When the transmission information "0" has been transmitted, a radio signal is composed of four radio frames, F1, F2, F1 and F2, as shown in FIG. 11(a). Then, the wireless frames F1, F2, F1 and F2 have the frame lengths of 560 μs, 600 μs, 560 μs and 600 μs, respectively.

Accordingly, the FIFO 31-1 of the correlating circuit 23-1 receives the frame lengths of 560 μs, 600 μs, 560 μs and 600 μs from the frame length receiver 22 in the order of 560 μs, 600 μs, 560 μs, 600 μs, because no start frame SF is used when the receiver 2A is used as described above.

At the moment when the FIFO 31-1 receives the first frame length (=560 μs), the FIFOs 31-2 to 31-4 have not received a frame length; thus, the comparators 33-2 to 33-4 output a signal of L level to the AND circuit 34. Accordingly, the AND circuit 34 outputs a signal of L level to the host system 4.

At the moment when the FIFO 31-2 and FIFO 31-1 receive the frame lengths of 560 μs and 600 μs, respectively, the FIFO 31-3 and 31-4 have not received a frame length; thus, the comparators 33-3 and 33-4 output a signal of L level to the AND circuit 34. Accordingly, the AND circuit 34 outputs a signal of L level to the host system 4.

At the moment when the FIFO 31-3, FIFO 31-2 and FIFO 31-1 receive the frame lengths of 560 μs, 600 μs and 560 μs, respectively, the FIFO 31-4 has not received a frame length; thus, the comparator 33-4 outputs a signal of L level to the AND circuit 34. Accordingly, the AND circuit 34 outputs a signal of L level to the host system 4.

Then, when the FIFOs 31-4 to 31-1 receive the frame lengths of 560 μs, 600 μs, 560 μs and 600 μs, respectively, and output the received frame lengths of 560 μs, 600 μs, 560 μs and 600 μs to the comparators 33-4 to 33-1, respectively, then, the comparator 33-4 receives the frame length of 560 μs from the memory 32-4, the comparator 33-3 receives the frame length of 600 μs from the memory 32-3, the comparator 33-2 receives the frame length of 560 μs from the memory 32-2 and the comparator 33-1 receives the frame length of 600 μs from the memory 32-1.

Then, the comparator 33-4 determines that the frame length of 560 μs received from the FIFO 31-4 is equal to the frame length of 560 μs received from the memory 32-4, and outputs a signal of H level to the AND circuit 34. The comparator 33-3 determines that the frame length of 600 μs received from the FIFO 31-3 is equal to the frame length of 600 μs received from the memory 32-3, and outputs a signal of H level to the AND circuit 34. The comparator 33-2 determines that the frame length of 560 μs received from the FIFO 31-2 is equal to the frame length of 560 μs received from the memory 32-2, and outputs a signal of H level to the AND circuit 34. The comparator 33-1 determines that the frame length of 600 μs received from the FIFO 31-1 is equal to the frame length of 600 μs received from the memory 32-1, and outputs a signal of H level to the AND circuit 34.

Then, the AND circuit 34 receives signals of H level from the comparators 33-1 to 33-4, calculates the logical product of the received signals of H level, and outputs a signal of H level to the host system 4.

The memories 32-4 to 32-1 of the correlating circuit 23-2 store the four frame lengths of 560 μs, 600 μs, 600 μs and 560 μs that constitute the transmission information "1", respectively; the memories 32-4 to 32-1 of the correlating circuit 23-3 store the four frame lengths of 600 μs, 560 μs, 560 μs and 600 μs that constitute the transmission information "2", respectively; and the memories 32-4 to 32-1 of the correlating circuit 23-4 store the four frame lengths of 600 μs, 560 μs, 600 μs and 560 μs that constitute the transmission information "3", respectively.

When the transmission information "0" has been transmitted, the correlating circuit 23-2 outputs a signal of L level to the host system 4 since the pattern of an even number of frame lengths received from the frame length receiver 22 does not match the pattern of the four frame lengths of 560 μs, 600 μs, 600 μs and 560 μs stored in the memories 32-4 to 32-1. Similarly, the correlating circuits 23-3 and 23-4 output signals of L level to the host system 4.

The host system 4 manages the correlating circuits 23-1 to 23-4 in association with the transmission information "0", "1", "2" and "3", respectively, and, when it receives a signal of H level from the correlating circuits 23-1 to 23-4, it detects that the receiver 2A has received the transmission information "0", "1", "2" and "3", respectively.

Thus, when the host system 4 receives a signal of H level from the correlating circuit 23-1 and receives a signal of L level from each of the correlating circuits 23-2 to 23-4, it detects that the receiver 2A has received the transmission information "0".

Further, when the transmission information "1" has been transmitted, the correlating circuit 23-2 outputs a signal of H level to the host system 4 and each of the correlating circuits 23-1, 23-3 and 23-4 outputs a signal of L level to the host system 4. Accordingly, the host system 4 detects that the receiver 2A has received the transmission information "1".

Furthermore, when the transmission information "2" has been transmitted, the correlating circuit 23-3 outputs a signal of H level to the host system 4 and each of the correlating circuits 23-1, 23-2 and 23-4 outputs a signal of L level to the host system 4. Accordingly, the host system 4 detects that the receiver 2A has received the transmission information "2".

Furthermore, when the transmission information "3" has been transmitted, the correlating circuit 23-4 outputs a signal of H level to the host system 4 and each of the correlating circuits 23-1 to 23-3 outputs a signal of L level to the host system 4. Accordingly, the host system 4 detects that the receiver 2A has received the transmission information "3".

When the transmission information k is frame-length-modulated by using the method shown in one of FIGS. 5 to 9 and then transmitted, the receiver 2A uses the number of correlating circuits provided corresponding to the number of the transmission information k to determine whether the pattern of the received even number of frame lengths matches the pattern of the even number of frame lengths constituting the transmission information k, and outputs the determination result to the host system 4.

Thus, by using the receiver 2A, only the determination as to whether the pattern of the received even number of frame lengths matches the pattern of the even number of frame lengths constituting the transmission information k is output to the host system 4, thus eliminating the necessity to detect an error in a code, accordingly, the transmission information k can be rapidly received.

Figure 23:
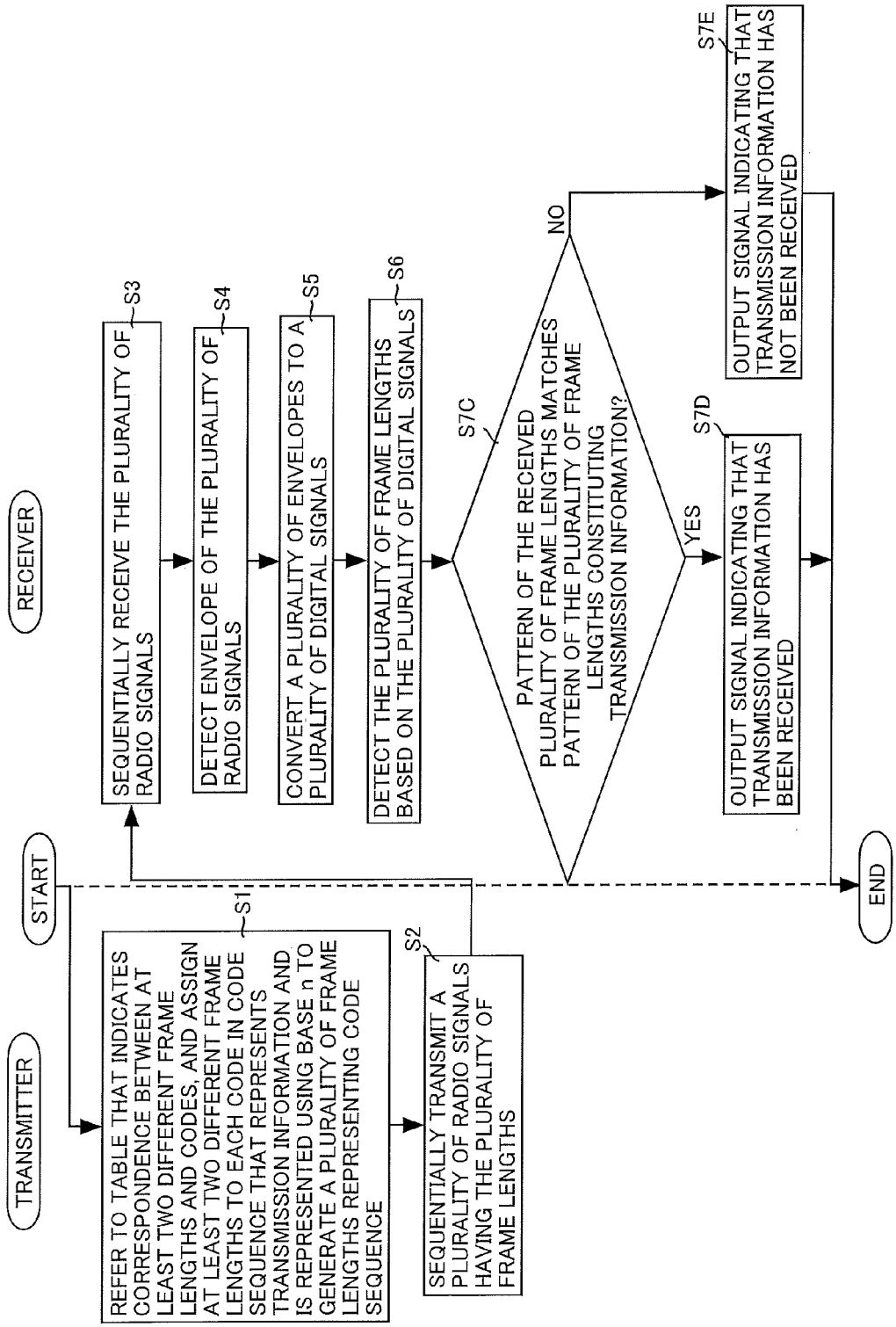
FIG. 23 is a flow chart illustrating a wireless communication method in the wireless communication system in the case that the receiver shown in FIG. 20 is used.

FIG. 23 is a flow chart illustrating a wireless communication method in the wireless communication system 10 in the case that the receiver 2A shown in FIG. 20 is used.

The flow chart shown in FIG. 23 is the same as that shown in FIG. 15 except that the step S7 of the flow chart shown in FIG. 15 is replaced by steps S7C, S7D and S7E.

Referring to FIG. 23, when transmission of the transmission information k has started, the steps S1 to S6 described above are sequentially performed.

Then, after the step S6, the correlating circuits determine whether the pattern of the received plurality of frame lengths matches the pattern of the plurality of frame lengths constituting the transmission information k (step S7C).

In the step S7C, when it is determined that the pattern of the received even number of frame lengths matches the pattern of the plurality of frame lengths constituting the transmission information k, each of the correlating circuits outputs to the host system 4 a signal of H level, i.e. a signal indicating that transmission information has been received (step S7D).

On the other hand, when it is determined in the step S7C that the pattern of the received even number of frame lengths does not match the pattern of the plurality of frame lengths constituting the transmission information k, each of the correlating circuits outputs to the host system 4 a signal of L level, i.e. a signal indicating that transmission information has not been received (step S7E).

Then, after the step S7D or S7E, a series of operation ends.

Thus, the receiver 2A detects frame lengths using the same method as the receiver 2. Power consumption in the receiver 2A can be reduced.

In the above description, the receiver 2A includes the number of correlating circuits 23-1 to 23-$m$ that is the same as the number m of types of transmission information k; however, embodiments of the present invention are not limited to such arrangements, and the receiver 2A may include the number of correlating circuits that is the same as a desired number of types of transmission information k out of the number m of types of the transmission information. For example, in the context of the above-described implementation, the receiver 2A may include two correlating circuits 23-1 and 23-3 to receive the transmission information "0" and "2" out of the transmission information "0", "1", "2" and "3". Similar methods may be used when transmission information other than the transmission information "0" and "2" out of the transmission information "0", "1", "2" and "3" are received.

Figure 24:
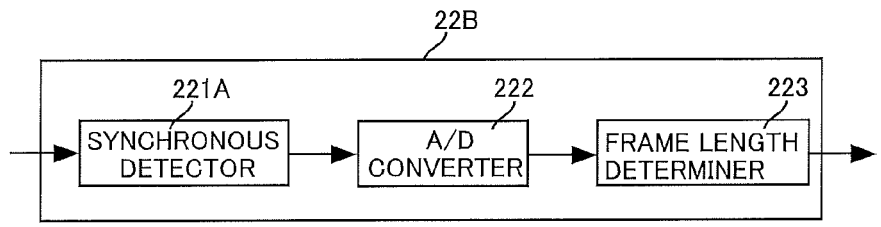
FIG. 24 is a schematic diagram of yet another configuration of the frame length receiver shown in FIG. 3.

FIG. 24 is a schematic diagram of yet another configuration of the frame length receiver shown in FIG. 3. In an embodiment of the present invention, the receiver 2 may include a frame length receiver 22B shown in FIG. 24 in place of the frame length receiver 22.

Referring to FIG. 24, the frame length receiver 22B is the same as the frame length receiver 22 except that the envelope detector 221 of the frame length receiver 22 shown in FIG. 12 is replaced by a synchronous detector 221A.

The synchronous detector 221A receives a radio signal via the antenna 21 and detects the received reception signal in a synchronized manner using the method described below, and outputs the synchronously detected signal to the A/D converter 222.

Figure 25:
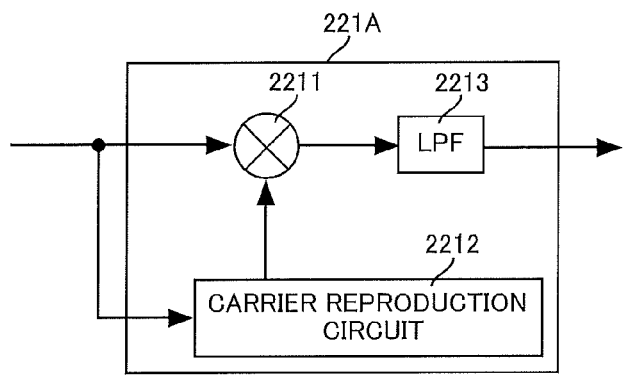
FIG. 25 is a schematic diagram of a configuration of the synchronous detector shown in FIG. 24.

FIG. 25 is a schematic diagram of a configuration of the synchronous detector 221A shown in FIG. 24. Referring to FIG. 25, the synchronous detector 221A includes a multiplier 2211, a carrier reproduction circuit 2212 and a low pass filter (LPF) 2213.

The multiplier 2211 receives a radio signal via the antenna 21, and receives a carrier wave from the carrier reproduction circuit 2212. Then, the multiplier 2211 multiplies the reception signal of the radio signal by the carrier wave and outputs the multiplied signal to the LPF 2213.

The carrier reproduction circuit 2212 receives a radio signal via the antenna 21 and reproduces the carrier wave based on the reception signal of the received radio signal. The carrier wave has the same frequency and phase as those of the carrier wave of the transmitted radio signal. Then, the carrier reproduction circuit 2212 outputs the reproduced carrier wave to the multiplier 2211.

The LPF 2213 receives the multiplied signal from the multiplier 2211, removes the high-pass components of the received multiplied signal and outputs the low-pass components of the multiplied signal to the A/D converter 222.

Figure 26:
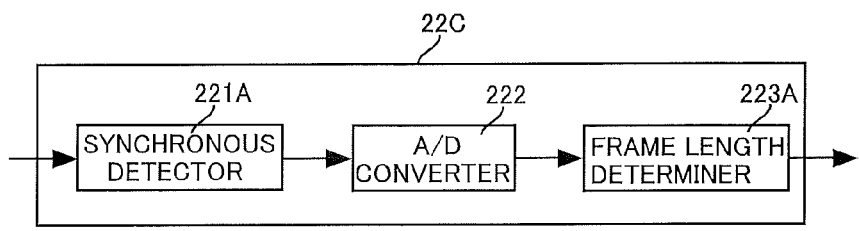
FIG. 26 is a schematic diagram of still another configuration of the frame length receiver shown in FIG. 3.

FIG. 26 is a schematic diagram of still another configuration of the frame length receiver shown in FIG. 3. In an embodiment of the present invention, the receiver 2 may include a frame length receiver 22C shown in FIG. 26 in place of the frame length receiver 22.

Referring to FIG. 26, the frame length receiver 22C is the same as the frame length receiver 22A except that the envelope detector 221 of the frame length receiver 22A shown in FIG. 16 is replaced by the synchronous detector 221A.

The synchronous detector 221A is described above.

Thus, each of the frame length receiver 22B and 22C detects a reception signal of a radio signal in a synchronized manner to detect frame lengths.

Each of the frame length receiver 22, 22A, 22B and 22C may detect frame lengths by detecting a reception signal of a radio signal using reproduction detection (Non-Patent Document 4).

As described above, the frame length receiver may detect a reception signal of a radio signal using the envelope detection, the synchronized detection, the reproduction detection and so on; generally, it may detect a reception signal of a radio signal using any method.

Figure 27:
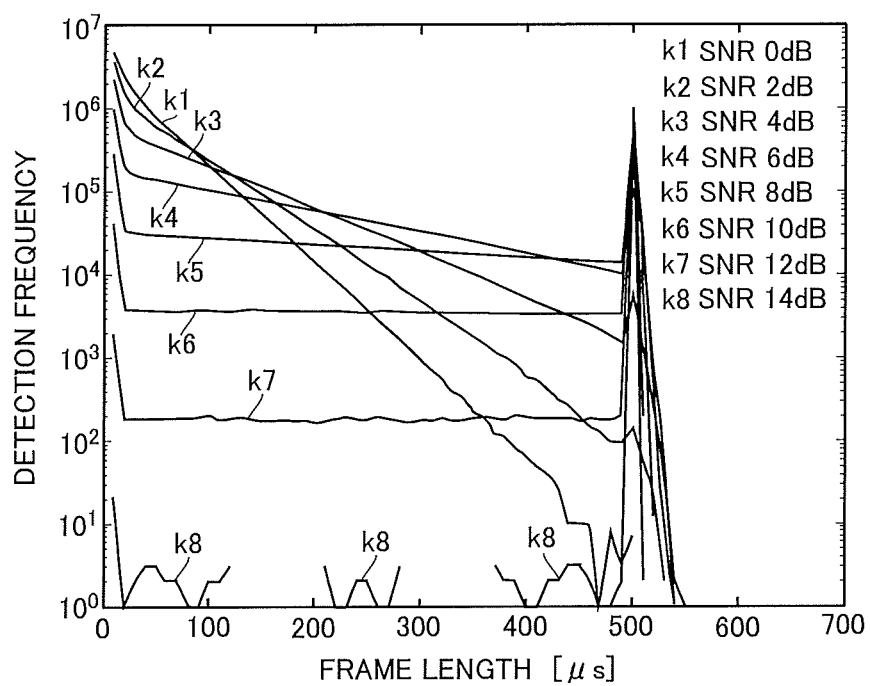
FIG. 27 illustrates the relationship between detection frequency and frame length.

FIG. 27 illustrates the relationship between detection frequency and frame length. In FIG. 27, the vertical axis represents the detection frequency, and the horizontal axis represents the frame length. The curves k1 to k8 show the relationship between the detection frequency and the frame length found when the frame length of 500 μs is received at the signal to noise ratios (SNRs) of 0 dB, 2 dB, 4 dB, 6 dB, 8 dB, 10 dB, 12 dB and 14 dB, respectively.

Referring to FIG. 27, the detection frequency at which the frame length of 500 μs is detected as a frame length smaller than 500 μs increases as the SNR decreases (see curves k1 to k8). The detection frequency at which the frame length of 500 μs is detected as a frame length greater than 500 μs is zero.

It have been verified that the frame length is rather likely to become erroneous to be taken for a smaller length when transmission information is frame-length-modulated and then transmitted.

FIG. 28 illustrates the relationship between false positive rate and the transmission information. In FIG. 28, the vertical axis represents the false positive rate, and the horizontal axis represents the transmission information.

FIG. 28($a$) illustrates the relationship between the false positive rate and the transmission information found when frame length modulation is performed according to an embodiment of the present invention, and FIG. 28($b$) illustrates the relationship between the false positive rate and the transmission information found when frame length modulation is performed in a conventional manner.

In FIG. 28($a$), the straight lines k9 to k11 show the relationship between the false positive rate and the transmission information for the SNRs of 9 dB, 10 dB and 11 dB, respectively; in FIG. 28($b$), the curves k12 to k17 show the relationship between the false positive rate and the transmission information for the SNRs of 6 dB, 7 dB, 8 dB, 9 dB, 10 dB and 11 dB, respectively.

In FIG. 28, the false positive rate for the transmission information "0" is the rate at which the information other than the transmission information "0" ("1" to "255") become erroneous to be taken for the transmission information "0" when the information other than the transmission information "0" is transmitted.

Referring to FIG. 28, if the frame length modulation method according to an embodiment of the present invention is employed, the false positive rate does not depend on the transmission information ("0" to "255") and is substantially constant (see straight lines k9 to k11).

On the other hand, if a conventional frame length modulation method is employed, there are transmission information that are more likely to become erroneous than other transmission information, such as the transmission information "0" (see curves k12 to k17).

If the frame length modulation method according to an embodiment of the present invention is employed, the false positive rate as a whole is smaller than that found when a conventional frame length modulation method is employed.

It have been verified that the error rate can be reduced by employing the frame length modulation method according to an embodiment of the present invention.

In the above description, two different frame lengths are assigned to each code in the base n, embodiments of the present invention are not limited to such an arrangement, and R different frame lengths (R is an integer not less than 3) may be assigned to each code in the base n. In this case, for two arbitrary codes in the base n, one frame length r1 of the R frame lengths assigned to one code is smaller than one frame length that is assigned to the same frame as the frame length r1 of the R frame lengths assigned to the other code, and one frame length r2 of the R frame lengths assigned to one code is greater than one frame length that is assigned to the same frame as the frame length r2 of the R frame lengths assigned to the other code.

In embodiments of the present invention, the encoding circuit 11 for assigning two different frame lengths to each code in a code sequence that constitutes transmission information constitutes a "generating means".

In embodiments of the present invention, the frame length modulation transmitter 12 generating an even number of radio frames having an even number of frame lengths received from the encoding circuit 11 and transmitting the generated even number of radio frames constitutes a "transmitting means".

The envelope detector 221 or synchronous detector 221A constitutes a "wave detecting means" detecting a reception signal; the A/D converter 222 constitutes a "converting means" converting the detected signal to a digital signal; the frame length determiner 223 and decoding circuit 23 together constitute a "decoding means" decoding transmission information; and the frame length determiner 223A constitutes a "detecting means" detecting a frame length.

In the above description, it is described that two or more frame lengths are assigned to each code in a code sequence obtained by converting transmission information to the base n for frame length modulation. In implementations where a code sequence obtained by converting transmission information to the base n is made up of an even number of codes, the transmission information is represented by an even number of frame lengths. In implementations where a code sequence obtained by converting transmission information to the base n is made up of an odd number of codes and an odd number (i.e. an odd number not less than 3) of frame lengths are assigned to each code, the transmission information is represented by an odd number (i.e. an odd number not less than 3) of frame lengths.

Generally, thus, a transmission information is represented by a plurality (not less than 2x) of frame lengths, and a plurality of frame lengths include an odd number not less than 3 of frame lengths and an even number not less than 2 of frame lengths.

As a result, the wording "even number of" in the above description may be replaced by "plurality of".

It should be understood that the embodiments disclosed herein are exemplary in every respect and not limitative. The scope of the present invention is not defined by the embodiments described above but the claims, and is intended to cover all the modifications in the spirit and scope equivalent to those of the claims.

INDUSTRIAL APPLICABILITY

The present invention is useful in a transmitter, a transmission method used by the same, a receiver for receiving a radio signal from the transmitter and a wireless communication system including the same.

The invention claimed is:
1. A transmitter comprising:
a generating unit configured to assign at least two different frame lengths to each code in a code sequence that represents transmission information and is represented using a base n (n is an integer not less than 2) to generate a plurality of frame lengths representing the code sequence; and
a transmitting unit configured to sequentially receive the plurality of frame lengths from the generating unit and to sequentially transmit a plurality of radio signals having the received plurality of frame lengths,
wherein the generating unit is configured to generate a plurality of frame lengths such that a first frame length included in a first plurality of frame lengths representing a first code sequence obtained by converting first transmission information to the base n is greater than a second frame length included in a second plurality of frame lengths representing a second code sequence obtained by converting second transmission information to the base n, the second transmission information being different from the first transmission information, and a third frame length included in the first plurality of frame lengths is smaller than a fourth frame length included in the second plurality of frame lengths,
a place in order of the first frame length within the first plurality of frame lengths is equal to a place in order of the second frame length within the second plurality of frame lengths, and
a place in order of the third frame length within the first plurality of frame lengths is equal to a place in order of the fourth frame length within the second plurality of frame lengths.
2. The transmitter according to claim 1, wherein, a number of types of the transmission information being denoted by m (m is an integer not less than 2), the code sequence is represented by x codes and x is the smallest integer not less than a result of calculating log nm, where n is a base,
the generating unit is configured to assign at least two different frame lengths to each of the x codes to generate 2x or more frame lengths, and the transmitting unit is configured to sequentially transmit 2x or more radio signals having the 2x or more frame lengths.

3. The transmitter according to claim 1, wherein the generating unit is configured to hold a table that associates each code in the base n and at least two different frame lengths, and to refer to the table and to generate the plurality of frame lengths.

4. A wireless communication system comprising:
the transmitter according to claim 1.

5. A transmission method comprising:
a first step assigning at least two different frame lengths to each code in a code sequence that represents transmission information and is represented using a base n (n is an integer not less than 2) to generate a plurality of frame lengths representing the code sequence; and
a second step sequentially transmitting a plurality of radio signals having the plurality of frame lengths generated in the first step,
wherein, in the first step, a plurality of frame lengths are generated such that a first frame length included in a first plurality of frame lengths representing a first code sequence obtained by converting first transmission information to the base n is greater than a second frame length included in a second plurality of frame lengths representing a second code sequence obtained by converting second transmission information to the base n, the second transmission information being different from the first transmission information, and a third frame length included in the first plurality of frame lengths is smaller than a fourth frame length included in the second plurality of frame lengths, and
wherein a place in order of the first frame length within the first plurality of frame lengths is equal to a place in order of the second frame length within the second plurality of frame lengths, and
a place in order of the third frame length within the first plurality of frame lengths is equal to a place in order of the fourth frame length within the second plurality of frame lengths.

6. The transmission method according to claim 5, wherein, a number of types of the transmission information being denoted by m (m is an integer not less than 2), the code sequence is represented by x codes and x is the smallest integer not less than a result of calculating log nm, where n is a base,
in the first step, at least two different frame lengths are assigned to each of the x codes and 2x or more frame lengths are generated, and
in the second step, 2x or more radio signals having the 2x or more frame lengths are sequentially transmitted.

7. The transmission method according to claim 5, wherein, in the first step, the plurality of frame lengths are generated based on a table that associates each code in the base n and at least two different frame lengths.

8. A receiver receiving a plurality of radio signals transmitted from a transmitter, the receiver comprising:
a wave detecting unit configured to detect reception signals of the plurality of radio signals;
a converting unit configured to convert the detection result detected by the detecting unit to digital signals; and
a decoding unit configured to detect a plurality of frame lengths based on the digital signals and to convert the detected plurality of frame lengths into a code sequence to decode transmission information.

9. The receiver according to claim 8, wherein the decoding unit is configured to exclude the frame lengths other than the frame lengths used to transmit the transmission information, and to convert the plurality of frame lengths to a code sequence.

10. The receiver according to claim 9, wherein the decoding unit is configured to exclude the frame lengths other than the frame lengths used to transmit the transmission information considering a tolerance in fluctuation of frame length.

11. A wireless communication system comprising:
the receiver according to claim 8.

12. A receiver receiving a plurality of radio signals transmitted from a transmitter, the receiver comprising:
a wave detecting unit configured to detect reception signals of the plurality of radio signals;
a converting unit configured to convert the detection result detected by the wave detecting unit to digital signals;
a detecting unit configured to detect a plurality of frame lengths based on the digital signals; and
a correlating circuit configured to determine whether an arrangement pattern of the detected plurality of frame lengths matches an arrangement pattern of the plurality of frame lengths, and, if it determines that the arrangement pattern of the plurality of frame lengths matches the arrangement pattern of the plurality of frame lengths, to output a signal indicating that transmission information including a code sequence corresponding to the arrangement pattern of the plurality of frame lengths has been received.

* * * * *